US009262861B2

(12) United States Patent
Zhu et al.

(10) Patent No.: US 9,262,861 B2
(45) Date of Patent: Feb. 16, 2016

(54) EFFICIENT COMPUTATION OF SHADOWS

(71) Applicant: Google Inc., Mountain View, CA (US)

(72) Inventors: Teng-Hui Zhu, San Jose, CA (US); John Hoford, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/337,115

(22) Filed: Jul. 21, 2014

(65) Prior Publication Data

US 2015/0371435 A1 Dec. 24, 2015

Related U.S. Application Data

(60) Provisional application No. 62/016,489, filed on Jun. 24, 2014.

(51) Int. Cl.
*G06T 15/60* (2006.01)
(52) U.S. Cl.
CPC ...................................... *G06T 15/60* (2013.01)
(58) Field of Classification Search
CPC ........................................................ G06T 15/60
See application file for complete search history.

(56) References Cited

U.S. PATENT DOCUMENTS

| 5,495,536 | A | * | 2/1996 | Osbourn | G06K 9/346 |
| | | | | | 382/174 |
| 5,808,620 | A | * | 9/1998 | Doi | G06T 15/60 |
| | | | | | 345/426 |
| 7,817,823 | B1 | | 10/2010 | O'Donnell | |
| 8,379,021 | B1 | | 2/2013 | Miller et al. | |
| 8,638,989 | B2 | | 1/2014 | Holz | |
| 2003/0174049 | A1 | | 9/2003 | Beigel et al. | |
| 2012/0256915 | A1 | | 10/2012 | Jenkins | |
| 2014/0085101 | A1 | | 3/2014 | Rahman et al. | |
| 2014/0111534 | A1 | * | 4/2014 | Niles | G06T 15/60 |
| | | | | | 345/589 |
| 2014/0240477 | A1 | * | 8/2014 | Feng | H04N 5/217 |
| | | | | | 348/77 |

FOREIGN PATENT DOCUMENTS

EP    0 702 333 A2    9/1996

OTHER PUBLICATIONS

R. Fernando, "Percentage-Closer Soft Shadows",32nd International Conference on Computer Graphics and Interactive Techniques (SIGGRAPH 2005), Jul. 31, 2005, Sketches Article No. 35, Association for Computing Machinery, Los Angeles, CA.
J.M. Hasenfratz et al, "A Survey of Real-time Soft Shadows Algorithms", Computer Graphics Forum, Dec. 2003, vol. 22, No. 4, p. 753-774, Blackwell Publishers, Oxford UK.
Zhu et al., "Efficient Computation of Shadows for Circular Light Sources", U.S. Appl. No. 14/530,282, filed Oct. 31, 2014.

* cited by examiner

*Primary Examiner* — Jeffrey Chow
(74) *Attorney, Agent, or Firm* — McDonnell Boehnen Hulbert & Berghoff LLP

(57) ABSTRACT

Methods and apparatus are provided for displaying shadows of polygonal light sources. A computing device can determine a light-source polygon of a polygonal light source, where the light-source polygon includes light-source vertices. The computing device can determine an occluding polygon between the light-source polygon and a background surface. The computing device can determine a shadow of the occluding polygon on the background surface by: for each light-source vertex, determining a vertex-shadow region of the background surface corresponding to a shadow cast upon the background surface by the occluding polygon for light emitted from the light-source vertex, determining an umbra of the shadow based on an intersection of the vertex-shadow regions, and determining a penumbra of the shadow based on a convex representation of a union of vertex-shadow regions. The computing device can display the shadow.

20 Claims, 14 Drawing Sheets

EFFICIENT COMPUTATION OF SHADOWS

CROSS-REFERENCE TO RELATED APPLICATIONS

This application claims priority to U.S. Patent App. No. 62/016,489, entitled "Efficient Computation of Shadows", filed Jun. 24, 2014, the contents of which are fully incorporated by reference herein for all purposes.

BACKGROUND

Unless otherwise indicated herein, the materials described in this section are not prior art to the claims in this application and are not admitted to be prior art by inclusion in this section.

Many modern computing devices, including mobile phones, personal computers, and tablets, provide graphical user interfaces (GUIs) for permitting users to interact with the computing device. For example, application programs can use the GUI to communicate with a user using images, text, and graphical elements such as windows, dialogs, pop-ups, images, buttons, scrollbars, and icons. The GUI can also receive inputs from user-interface devices such as touch screens, computer mice, keyboards, and other user-interface devices to permit the user to control the GUI, and thus the application program.

In some cases, the GUI can be used to interact with an operating system (OS) to manage the computing device. For example, the OS can have a control panel or setting application that uses the GUI to draw one or more windows related to control settings for some aspect(s) of the computing device, such as audio controls, video outputs, computer memory, and human language(s) used by the OS (e.g., choose to receive information in English, French, Mandarin, Hindi, Russian, etc.). The control panel/settings application can receive subsequent input related to the window(s) using the GUI. The GUI can provide the inputs to the OS, via the control panel/settings application, to manage the computing device.

SUMMARY

In one aspect, a method is provided. A computing device determines a light-source polygon of a polygonal light source. The polygonal light source is configured to emit light. The light-source polygon includes a plurality of light-source vertices. The computing device determines an occluding polygon. The occluding polygon is between the light-source polygon and a background surface. The computing device determines a shadow of the occluding polygon on the background surface by at least: for each light-source vertex in the plurality of light-source vertices, determining a vertex-shadow region of the background surface corresponding to a shadow cast upon the background surface by the occluding polygon for light emitted from the light-source vertex; determining an umbra of the shadow of the occluding polygon based on an intersection of the plurality of vertex-shadow regions, and determining a penumbra of the shadow of the occluding polygon based on a convex representation of a union of the plurality of vertex-shadow regions. The computing device provides a display of at least part of the shadow of the occluding polygon.

In another aspect, a computing device is provided. The computing device includes a processor and a tangible computer readable medium. The tangible computer readable medium is configured to store at least executable instructions. The executable instructions, when executed by the processor, cause the computing device to perform functions including: determining a light-source polygon of a polygonal light source configured to emit light, where the light-source polygon includes a plurality of light-source vertices; determining an occluding polygon, where the occluding polygon is between the light-source polygon and a background surface; determining a shadow of the occluding polygon on the background surface by at least: for each light-source vertex in the plurality of light-source vertices, determining a vertex-shadow region of the background surface corresponding to a shadow cast upon the background surface by the occluding polygon for light emitted from the light-source vertex, determining an umbra of the shadow of the occluding polygon based on an intersection of the plurality of vertex-shadow regions, and determining a penumbra of the shadow of the occluding polygon based on a convex representation of a union of the plurality of vertex-shadow regions; and providing a display of at least part of the shadow of the occluding polygon.

In another aspect, an article of manufacture is provided. The article of manufacture includes a tangible computer readable medium configured to store at least executable instructions. The executable instructions, when executed by a processor of a computing device, cause the computing device to perform functions comprising: determining a light-source polygon of a polygonal light source configured to emit light, where the light-source polygon includes a plurality of light-source vertices; determining an occluding polygon, where the occluding polygon is between the light-source polygon and a background surface; determining a shadow of the occluding polygon on the background surface by at least: for each light-source vertex in the plurality of light-source vertices, determining a vertex-shadow region of the background surface corresponding to a shadow cast upon the background surface by the occluding polygon for light emitted from the light-source vertex, determining an umbra of the shadow of the occluding polygon based on an intersection of the plurality of vertex-shadow regions, and determining a penumbra of the shadow of the occluding polygon based on a convex representation of a union of the plurality of vertex-shadow regions; and providing a display of at least part of the shadow of the occluding polygon.

In another aspect, a device is provided. The device includes: means for determining a light-source polygon of a polygonal light source configured to emit light, where the light-source polygons including a plurality of light-source vertices; means for determining an occluding polygon, wherein the occluding polygon is between the light-source polygon and a background surface; means for determining a shadow of the occluding polygon on the background surface including: means, for each light-source vertex in the plurality of light-source vertices, for determining a vertex-shadow region of the background surface corresponding to a shadow cast upon the background surface by the occluding polygon for light emitted from the light-source vertex, means for determining an umbra of the shadow of the occluding polygon based on an intersection of the plurality of vertex-shadow regions, and means for determining a penumbra of the shadow of the occluding polygon based on a convex representation of a union of the plurality of vertex-shadow regions; and means for providing a display of at least part of the shadow of the occluding polygon.

DETAILED DESCRIPTION

Efficient Shadow Calculations

Figure 1:
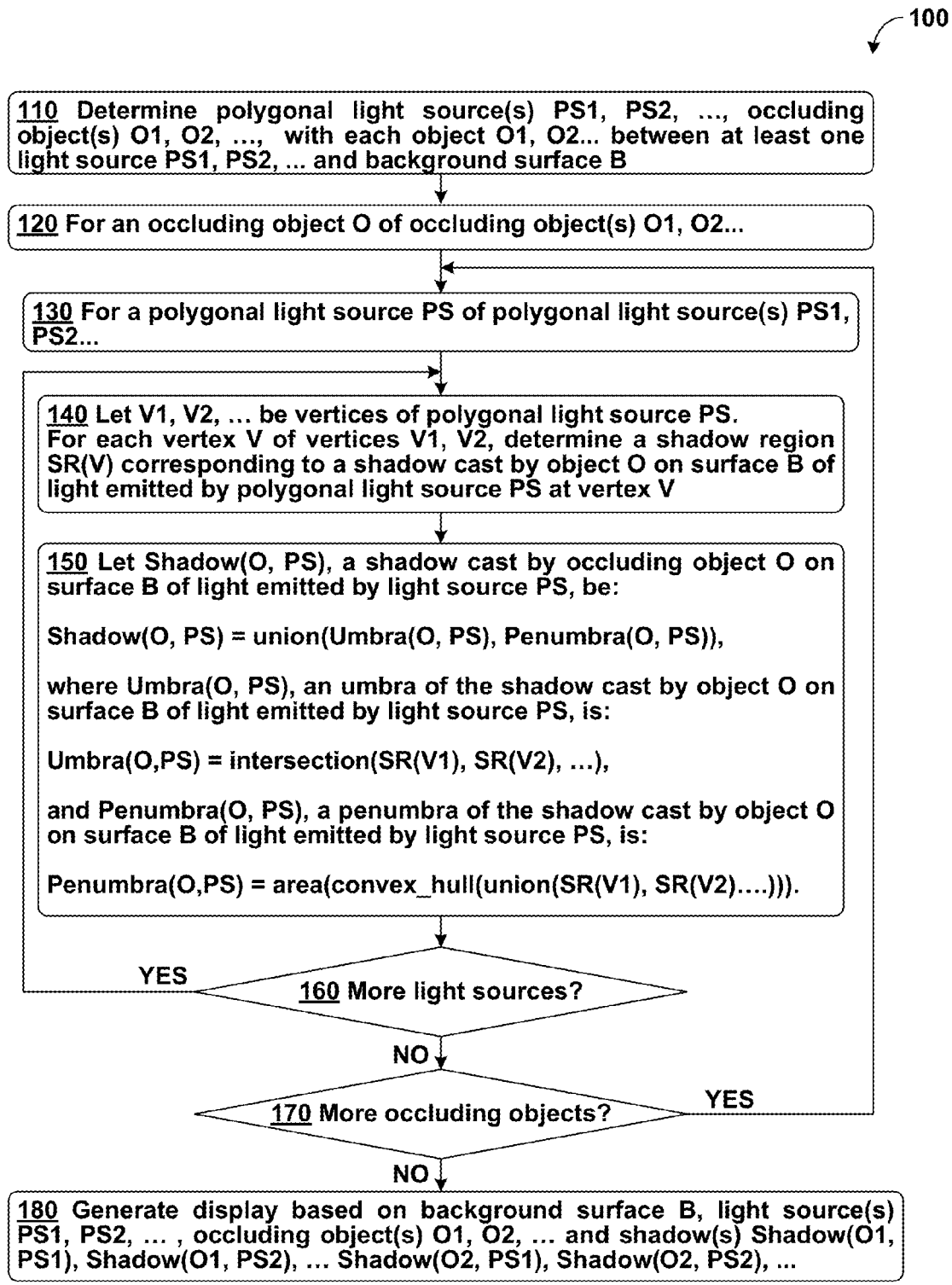
FIG. 1 is a flow chart illustrating a method for generating a display including a shadow, in accordance with an embodiment.

Modern graphical user interfaces can use depth to convey importance and structure. One intuitive technique to convey depth is to use shadows. Current approaches to shadows have been limited to replicate very simple lighting models. These simple lighting models often lack realism. Other approaches, such as shadow mapping and shadow volumes, can be too computationally expensive for mobile devices, such as smart phones. Further, these other approaches are typically targeted to shadow objects with complex geometries. In contrast, a graphical user interface for a mobile device often renders objects with simple geometries, such as circles, triangles, and rectangles and related objects, such as rounded rectangles and ellipses.

A direct approach to providing shadows can begin with a fairly simple lighting configuration; e.g., simulating a planar polygon being illuminated by a polygonal light source. The polygonal light source can be represented as a set of light-source vertices, which can be the vertices of the light source polygon. Based on the geometry and physical computation, the shadow of light emitted by the polygonal light source that is cast by the planar polygon upon a background surface can be generated.

In a relatively simple example, the simulation can involve two polygons and one surface in 3-dimensional space (3-D)—a light source polygon, an occluding polygon, and a background surface. The light source polygon can block light emitted from the light source polygon that otherwise would reach the background surface and so cast a shadow on the background surface. In a real world example that could be modeled by the simulation, light emitted through a rectangular-shaped lamp shade (a light source polygon) toward a wall (a background surface) can be partially blocked by a birthday card (an occluding polygon) held between the lamp shade and the wall. Then, the birthday card would cast a shadow of light emitted from the lamp shade on the wall.

The simulation can involve the following procedures:
1. Let V1, V2 ... Vn, be the n vertices of the light source polygon. For each vertex V={V1, V2 ... Vn} of the light source polygon, determine a vertex shadow VS(V) cast by the occluding object by:
    a. Cast ray(s) of light from vertex V toward the background surface by way of the occluding polygon,
    b. Determine which ray(s) of light are blocked by the occluding polygon from reaching the background surface, and
    c. Determine vertex shadow VS(V) based on the rays of light blocked by the occluding polygon from reaching the background surface
2. Determine a shadow of the occluding object based on the vertex shadows VS(V1), VS(V2) ... VS(Vn) as follows:
    a. Calculate an umbra Umbra, or a portion of a shadow that excludes all light from the light source, based on taking the intersection of the vertex shadows; e.g., Umbra=$\cap_{i=1}^{n}$VS(Vi).
    b. Calculate a penumbra Penumbra, or lighter part of the shadow, be an area enclosed by a convex hull of the union of vertex shadows; e.g., Penumbra=area(convex_hull($\cup_{i=1}^{n}$VS(Vi))).
    c. The shadow can be the union of Umbra and Penumbra; e.g., the area within the convex hull of the union of vertex shadows.
3. Calculate a graphical representation of the shadow. For example, the area between Umbra and Penumbra can be triangulated with black colored triangles, with vertices on the Umbra having fully opaque transparency and vertices in the Penumbra having partially opaque or fully transparent opacity.

In a GUI scenario, the occluding polygon can be a GUI element; e.g., a window, dialog box, card. The background surface can be a background of the GUI; e.g., a home screen or other background, or some other GUI element; e.g., another window or card.

The simulation can be expanded to include multiple occluding polygons and/or multiple light sources. The occluding polygons and/or emitted light can be colored or uncolored; e.g., white. Then, as shadows from each light source are determined, the shadows can be combined to show a resulting combined shadow.

This simulation can directly output one or more polygons representing the shadow. In some cases, triangles can be output to represent the shadow, as triangles may be relatively easy to render and display by a graphics processing unit (GPU) and/or other processors of a device. Direct output of polygons representing the shadow can be helpful to a mobile device performing this simulation, since a GPU of the mobile device may be relatively slow at filling pixels, which can shadow maps/shadow volume approaches to incur substantial performance penalties.

The simulation can be simple and fast to calculate and is based on well-defined algorithms, such as convex-hull algorithms, polygon union and intersection algorithms, point intersection of points, intersection of polygons, centroids). In some embodiments, simple fixed amount triangles can be generated, and in particular embodiments, a relatively small number of triangles; e.g., about 1000 triangles. Rendering a shadow having 1000 triangles should not significantly affect performance on a modern mobile device that can be capable of rendering 40 million or more triangles per second.

This approach can provide realistic looking shadows using limited processing power. In the context of GUIs, the resulting shadowed objects can have shadows that look more correct compared to other approaches without incurring a performance penalty so great to make the GUI unusable. Further, GUI objects with shadows can be readily identified as being on top of (or below) other GUI elements, as users are intuitively aware of visual cues provided by shadows. Also, shadows are relatively unobtrusive, providing depth information without requiring too much user attention to observe the GUI. Further, other computer applications beyond GUIs, such as games and other applications, can use the herein-described techniques to provide realistic looking shadows at a reasonable computational cost.

Method for Generating Displays of Shadows

FIG. 1 is a flow chart illustrating method 100 for generating a display including a shadow, in accordance with an embodiment.

Method 100 can begin at block 110, where one or more polygonal light sources PS1, PS2 . . . a background surface B, and one or more occluding objects O1, O2 . . . can be determined. A polygonal light source is a light source whose shape can be represented by a polygon. In some embodiments, each polygonal light source PS1, PS2 . . . can be a convex polygonal light source; that is, a light source whose shape can be represented by a convex polygon. Each polygonal light source PS1, PS2 . . . can be represented by a polygon, which includes a plurality of vertices and a plurality of straight line segments connecting the vertices that form a circuit of the plurality of vertices. Further, each polygonal light source PS1, PS2 . . . can emit light.

In some embodiments, each polygonal light source PS1, PS2 . . . emits white light, while in other embodiments, some or all of the polygonal light sources can emit colored light representable by a red/green/blue (RGB) triple, or other color representation (e.g., HSV, Pantone number). Similarly, in some embodiments, each occluding object O1, O2 . . . and/or background surface B can be white object(s), while in other embodiments, some or all of the occluding objects and/or background surface can have one or more colors, each color representable by a RGB triple or other color representation.

Each occluding object O1, O2 . . . is between at least one of the polygonal light sources PS1, PS2 . . . and the background surface B. Initially, all occluding objects O1, O2 . . . are indicated as not having been selected.

At block 120, select O as an occluding object of the occluding objects O1, O2 . . . that is indicated as not having been selected. Also, indicate that all polygonal light sources PS1, PS2 have not been selected.

At block 130, select PS as a polygonal light source of the polygonal light sources PS1, PS2 . . . that is indicated as not having been selected.

At block 140, let V1, V2 . . . be the vertices of polygonal light source PS. Then, for each vertex V of vertices V1, V2 . . . determine a shadow region SR(V) for vertex V that corresponds to a shadow cast by object O on surface B of light emitted by polygonal light source PS at vertex V.

Figure 2:
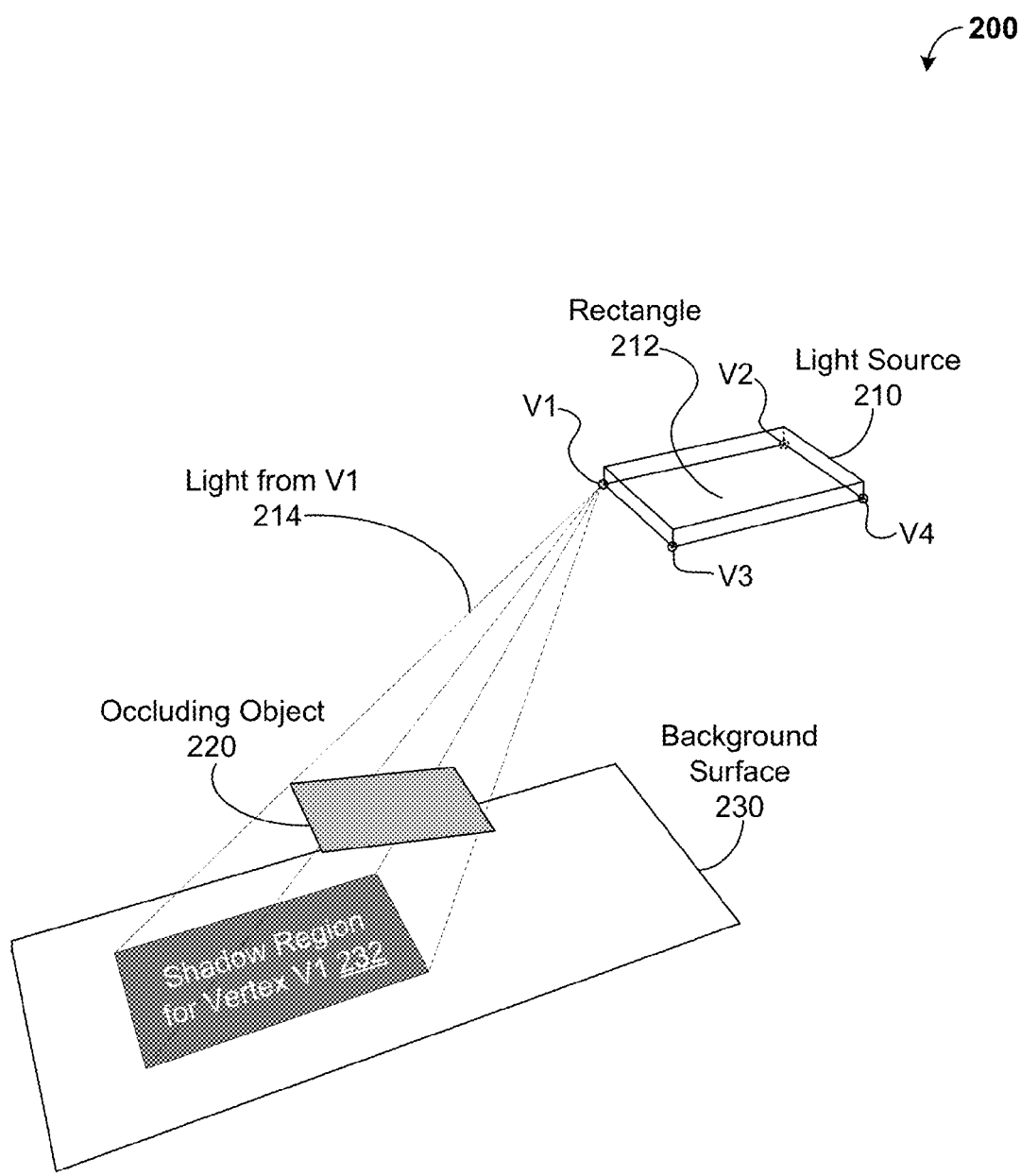
FIG. 2 depicts a scenario for generating a shadow, in accordance with an embodiment.

FIG. 2 depicts scenario 200 where a shadow region 232 is generated, in accordance with an embodiment. In scenario 200, light source 210 is represented by a convex polygon; e.g., rectangle 212, having four vertices: V1, V2, V3, and V4. As shown in FIG. 2, occluding object 220 is between light source 210 and at least part of background surface 230. In scenario 200, light emitted from vertex V1 214 can reach background surface 230, but some of light 214 is blocked by occluding object 220. Then, occluding object 220 can cast a shadow of light source 210 corresponding to shadow region 232 on background surface 230.

Returning to FIG. 1, at block 150, let Shadow(O, PS) be a shadow cast by occluding object O on background surface B of light emitted by light source PS. Shadow(O, PS) can be determined to be: Shadow(O, PS)=union(Umbra(O,PS), Penumbra(O,PS)), where union(A, B, . . . ) represents the mathematical union of elements A, B . . . .

In method 100, Umbra(O,PS), an umbra, or portion of Shadow(O, PS) excluding all light from light source PS, can be determined as: Umbra(O,PS)=intersection(SR(V1), SR(V2) . . . ); that is, the mathematical intersection of all of the shadow regions for light source PS. Penumbra(O, PS) can be determined as an area enclosed by a convex hull of a union of the shadow regions; that is Penumbra(O, PS)=area(convex hull(union(SR(V1), SR(V2) . . . ))), where union(A, B . . . ) returns the mathematical union of A, B . . . and convex_hull (R) returns the convex hull of a region R. The convex hull of a region R can be a smallest convex set of points that contains, or encloses, region R. Then, area(P) returns the area enclosed by a perimeter P.

Figure 3:
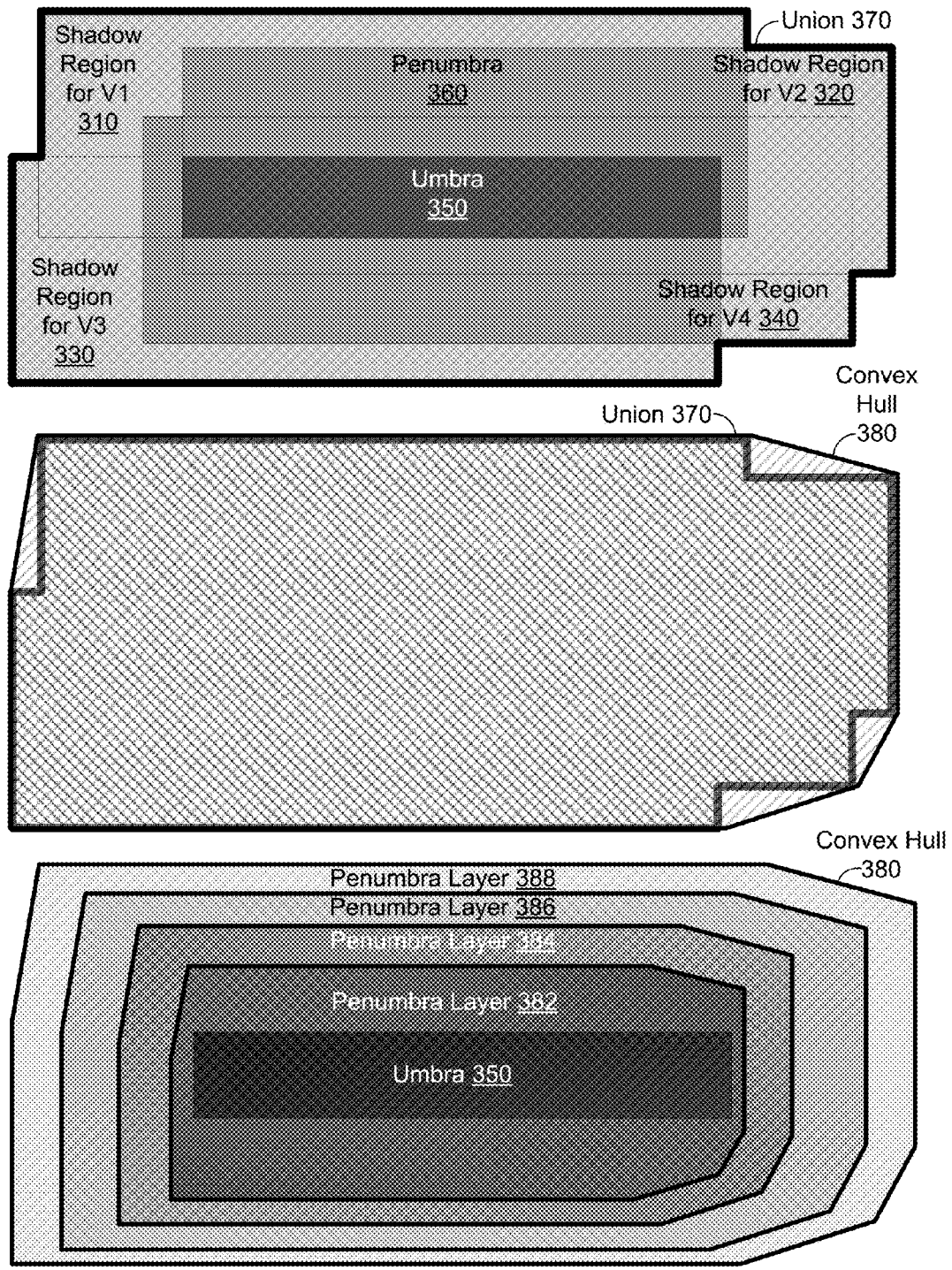
FIG. 3 depicts intersections and unions of shadow images and penumbra layers, in accordance with an embodiment.

The top image of FIG. 3 shows an example set of shadow regions for a light source 210, with shadow region for vertex V1 as shadow region 310, shadow region for vertex V2 as shadow region 320, shadow region for vertex V3 as shadow region 330, and shadow region for vertex V4 as shadow region 340. Then, umbra 350, is the intersection of shadow regions 310, 320, 330, and 340, and is shown as a black central region of union 370. Union 370 represents the union of shadow regions 310, 320, 330, and 340.

The middle image of FIG. 3 shows union 370 with surrounding convex hull 380. In the middle image of FIG. 3, an area with cross-hatching belongs to union 370, and areas with diagonal lines represent regions that are enclosed by convex hull 380, but do not belong in union 370. The areas with diagonal lines are a relatively small portion of the middle image of FIG. 3, indicating that an area enclosed by convex hull 380 should be a good approximation of union 370. Then, for the example shown in FIG. 3, Penumbra(O,PS) would be the area within convex hull 380.

For the example shown in FIG. 3, Shadow(O, PS) can be represented using one or more colors: one color representing umbra 350 and at least one (additional) color representing a penumbra region between umbra 350 and convex hull 380. Multiple penumbra layers can provide gradations of darkness for Shadow(O, PS). The lower image of FIG. 3 shows layers 382, 384, 386, 388 of relative light and darkness can be used to represent a penumbra. In the example shown in the lower image of FIG. 3, the darkest portion within convex hull 380 corresponds to umbra 350; i.e., the intersection of the shadow regions. Then, penumbra layer 382 closest to umbra 350 can be nearly as dark as umbra 350, next-closed penumbra layer 384 can be somewhat lighter than penumbra layer 382, and so on until reaching penumbra layer 388 whose outer boundary is convex hull 380 and which is shown in FIG. 3 to be lighter than any other penumbra layer 382, 384, 386, would be the area within convex hull 380.

In some embodiments, a shadow can be monochrome, but different portions; e.g., layers, can have different transparency values. For example, a shadow color can be determined based on a color of light emitted by a light source. That is, if a light source LSC emits light having color LC onto a background surface B1 having color BC, a shadow Shadow(O, LSC) of occluding object O cast on B1 for light emitted by LSC will have color C1, where C1=BC−LC, that is the color of the background surface BC with color of emitted light LC subtracted, or in some embodiments, C1=BC NAND LC, where NAND=the logical not AND function.

So, in an example where BC is white; e.g., BC=(255, 255, 255) as an RGB triple, and LC is white, that is LC=(255, 255, 255). Then, C1=BC−LC=(255, 255, 255)−(255, 255, 255)=RGB triple (0, 0, 0), which corresponds to the color black. In another example, let LSC emit pure blue light; e.g., LC can be represented by RGB triple=(0, 0, 255), then C1=(255, 255, 255)−(0, 0, 255)=(255, 255, 0), which corresponds to a pure yellow colored shadow.

Once a shadow color C1 is calculated, a shadow can have one color—C1—and have multiple transparency values based on relative darkness of portions of the shadow. For example, in the lower image of FIG. 3, C1 is black, and transparency values at convex hull 380 can be set to transparent (i.e., alpha=0), transparency values in umbra 350 can be set to opaque (alpha=255), and transparency values for penumbra layers 382, 384, 386, 388 can be set to intermediate values; e.g., alpha values of 204, 153, 102, 51 for respective penumbra layers 382, 384, 386, 388. In some embodiments, the umbra transparency can be adjusted to a maximum value M, M<256. Then, alpha values for penumbra layers 382, 384, 386, 388 can be linearly set respectively to 0.8 M, 0.6 M, 0.4 M, 0.2 M, or determined using some other formula; e.g., based on another linear function, based on an exponential function, based on another non-linear function, based on a user-specified function, etc.

In some scenarios, an intersection of the shadow regions can be the empty set; e.g., for very small occluding objects, and so the shadow may not have an umbra. In these scenarios, a center Center(PS) of polygonal light source PS can be determined, and the umbra can be based on a shadow SC generated from light cast from Center(PS) that is occluded by occluding object O onto background surface B. In some cases, the umbra can be represented by the shadow SC. In other cases, an umbra polygon can be generated by starting with shadow SC and adjusting a shape of the umbra polygon to have the same (or similar) shape to that of the occluding object.

In still other cases, Center(PS) and a center of occluding object O, Center(O), can be determined. Then a ray R1 can be cast from Center(PS) through Center(O) in the direction of background surface B, and a point R1(B) where ray R1 intersects surface B can determined. The point R1(B), which should be within SC, can be used as the umbra. The darkness of R1(B) can be tuned to be inversely proportional from the distance between O and B; e.g., the umbra is lighter for larger shadows and darker for smaller shadows, inversely proportional from the distance between O and PS; e.g., the umbra is lighter when the light source is far away, proportional from the distance between R1(B) and a nearest point N1 of shadow regions SR(V1), SR(V2) . . . to point R1(B), or using some other technique.

Returning to FIG. 1, at block 160, a determination is made as to whether all polygonal light sources have been selected. If all polygonal light sources have not yet been selected, method 100 can proceed to block 140. Otherwise, as all polygonal light sources have been selected, method 100 can proceed to block 170.

At block 170, a determination is made as to whether all occluding objects have been selected. If all occluding objects have not yet been selected, method 100 can proceed to block 130. Otherwise, as all occluding objects have been selected, method 100 can proceed to block 180.

At block 180, a display can be generated based on background surface B, polygonal light sources PS1, PS2 . . . , occluding objects O1, O2 . . . , and shadows Shadow(O1, PS1) . . . . For example, images 630 and 680 of FIG. 6 each show a display of one occluding object and its corresponding shadow as being lighted by one polygonal light source. Other example displays of occluding objects and corresponding shadows can be found in FIGS. 8-10.

Figure 10:
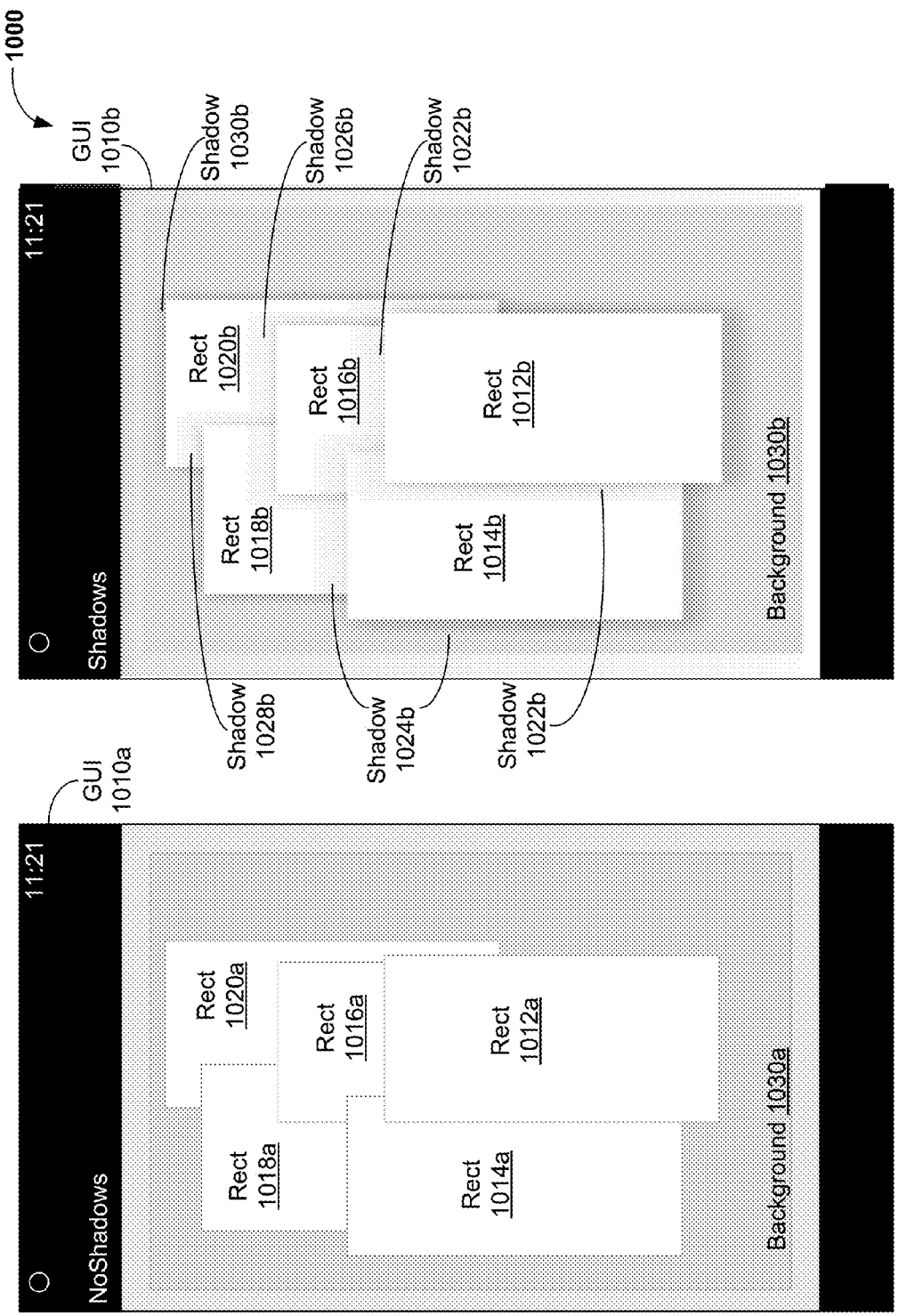
FIG. 10 depicts two example GUIs, each displaying a pattern of overlapping rectangles, in accordance with an embodiment.

In some embodiments, shadows can be cast on multiple background surfaces; for example, shadows are cast on several of the rectangles and the background of GUI 1010a, which is shown on the right side of FIG. 10.

In other embodiments, one or more of polygonal light sources PS1, PS2 . . . can be moved to simulate movement of planes relative to the light source to produce an enhanced 3D perspective. For example, suppose background surface B is in the plane of a display of a mobile device carrying out method 100; e.g., background surface B is a home screen of a GUI of the mobile device. In this example, background surface B is illuminated by at least one polygonal light sources PS1 positioned above background surface B. Then, as the mobile device is moved from side to side (tilted left, right, up, or down), the perspective of any occluding objects; e.g., GUI objects, displayed on B can change based on the movement of the mobile device. Further, if PS1 remains fixed while the mobile device moves, the lighting of occluding objects displayed on B can change based on the movement of the mobile device—for example, tilting the mobile phone to the left can cause shadows to be tilted to the left. In some of the other embodiments, PS1 can move with the phone to maintain a consistent view of occluding objects on B and their corresponding shadows.

In particular of these objects, one or more settings and/or other controls of the mobile device can be used to determine whether PS1 remains stationary or moves along with the mobile device. In other particular of these objects, one or more settings and/or other controls of the mobile device can be used to determine perspective of cards is maintained when the mobile device moves (that is, the cards appear to be fixed the home screen) or if perspective of cards changes as the mobile device moves (that is, the cards appear to be fixed in space on or slightly above the home screen, and so perspective of the cards can change as the plane of the background surface B/home screen of the mobile device changes).

Figure 4:
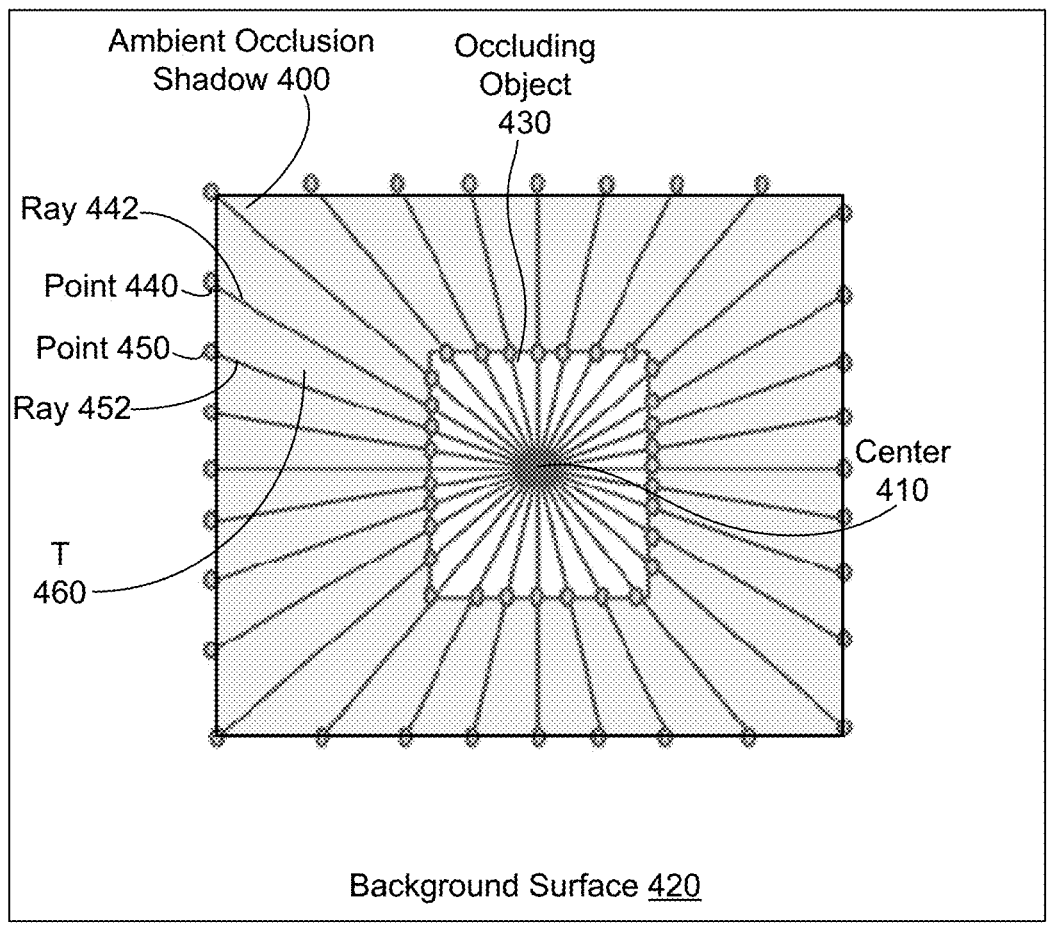
FIG. 4 depicts an ambient occlusion shadow, in accordance with an embodiment.

FIG. 4 depicts ambient occlusion shadow 400, in accordance with an embodiment. Ambient occlusion shadow 400 can represent ambient light, or background light without a specific light source. For example, ambient light can include light reflected from one or more surfaces; e.g., light that reaches a viewer after bouncing off walls, object, etc. in a scene being viewed.

For shadow generation, ambient light can be modeled as a uniform point light source centered over an occluding object. FIG. 4 shows shadow rays emitted from center 410, representing the point light source, passing occluding object 430 to reach edges of ambient occlusion shadow 400. Each shadow ray represents light blocked by occluding object 510 to generate ambient occlusion shadow 400. Background surface 420 can be a reference plane; e.g., the plane where z=0. The length of a shadow ray can be proportional to a height of occluding object 430 at its highest point. Opacity of ambient occlusion shadow 400 can be inversely proportional to the height of occluding object 430 at its highest point, and the center can have a maximum opacity value.

Shadow rays can be drawn in a regular fashion; for example, if N≥1 shadow rays are to be drawn, the first shadow ray can be drawn at a specific initial angle I (e.g., 0°, 90°, π radians) outward from center 410 toward an outer edge of ambient occlusion shadow 400. If N=1, only the initial ray need be drawn. Otherwise N>1 and so after the first ray is drawn, I can be incremented by a value ΔI(N), and another shadow ray drawn at the incremented angle I, I can be incremented again by ΔI(N) to draw another shadow ray, and so on until N rays are drawn. In some embodiments, ΔI(N) can depend on a representation used for angular measure; e.g., if degrees are used, then ΔI(N)=360/N; for radians=ΔI(N)=2π/N, etc. Other techniques for drawing shadow rays are possible as well.

In some embodiments, triangles can be rendered (drawn) efficiently by graphics-specific devices, such as graphics processing units (GPUs). To speed rendering, ambient occlusion shadow 400 can be represented as a collection of triangles. Each triangle can include three vertices: center 410 and two points on ambient occlusion shadow corresponding to two successive shadow rays. For example, successive shadow rays 442 and 452 shown in FIG. 4 reached the outer edge of ambient occlusion shadow 400 at respective points 440 and 450. Then, triangle (T) 460 representing a portion of ambient occlusion shadow 400 can be drawn between center 410, point 440, and point 450.

Figure 5:
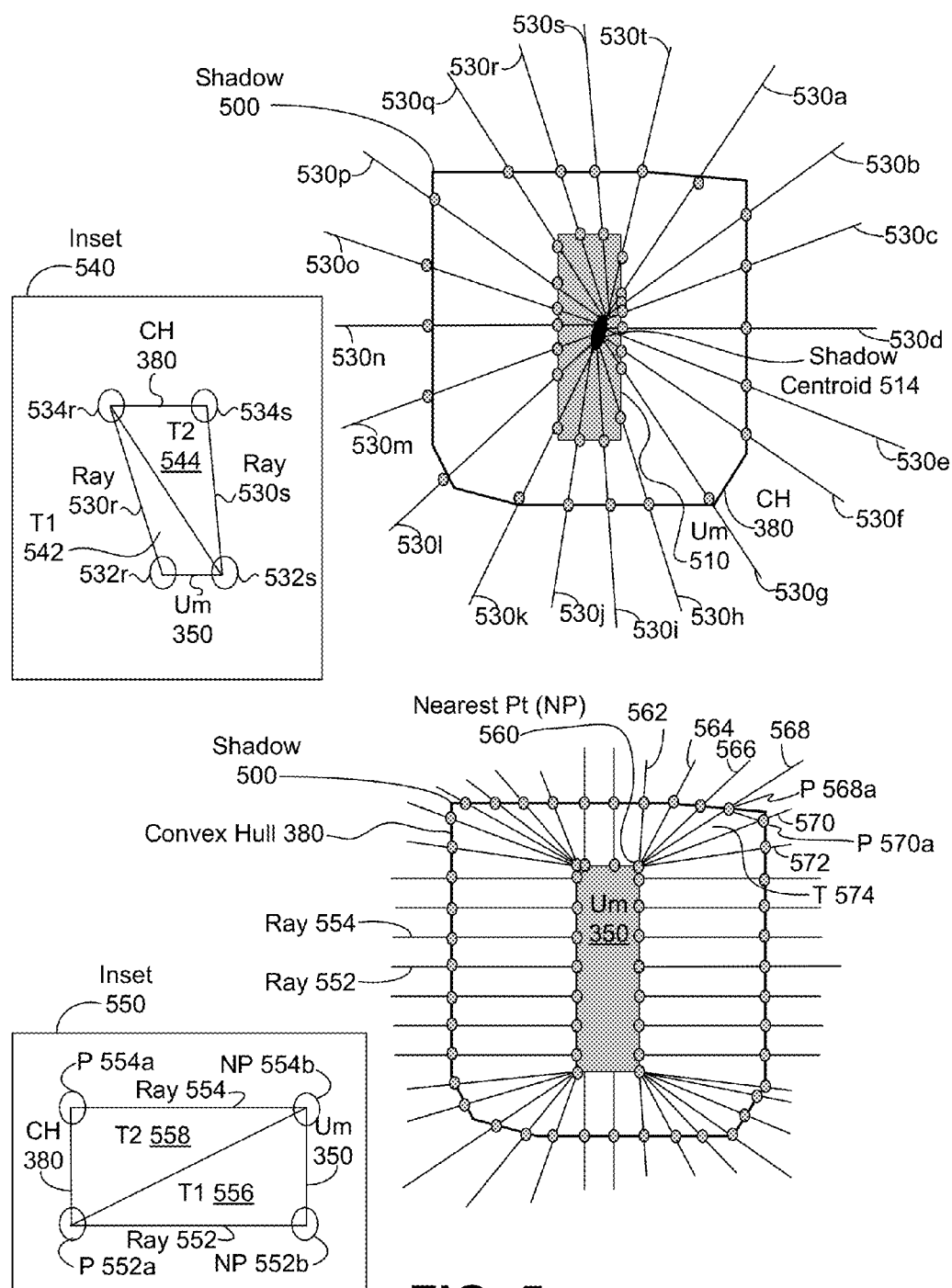
FIG. 5 depicts images of rays used in triangulating shadows, in accordance with an embodiment.

FIG. 5 depicts images of rays used in triangulating shadows, in accordance with an embodiment. Both an upper image of FIG. 5 and a lower image of FIG. 5 are images of shadow 500 to be generated using umbra (Um) 350, shown as a dark rectangle in both images, and convex hull 380. As discussed above in the context of FIGS. 1 and 3, umbra 350 and convex hull 380 can be generated using method 100. In that context, the upper and lower images of FIG. 5 are related to the techniques of block 180 of method 100—that is, techniques for generating a display based on triangulations of shadow 500.

The upper image of FIG. 5 shows shadow 500 with shadow rays 530a-530t emitted from shadow centroid 514 toward convex hull 380. A technique of drawing shadow rays from shadow centroid 514 toward convex hull 380 and generating triangles based on the shadow rays is termed "straight triangulation" herein.

The penumbra of shadow 500; that is, the region between an outer edge of umbra 350 and convex hull 380, can be triangulated based on shadow rays 530a-530t. For each shadow ray R, determine two points: U(R), which is the point where R intersects the outer edge of umbra 350, and C(R), which is the point where R intersects convex hull 380. Then for a pair of successive shadow rays, R1 and R2, drawn using straight triangulation, two triangles can be drawn that are based on rays R1 and R2—one triangle T1 using points C(R1), U(R1), and U(R2) and another triangle T2 from points C(R1), C(R2), and U(R2). For example, inset 540 of FIG. 5 shows portions of rays 530r and 530s. In inset 540, points U(R) for respective rays 530s, 530t are shown as points 532s, 532t and points C(R) for respective rays 530s, 530t shown as points 534s, 534t. In the example, let R1 be ray 530s and let R2 be ray 530t. Then, T1 542 can be drawn between C(R1)=534s, U(R1)=532s, and U(R2)=532t, and T2 544 can be drawn between C(R1)=534s, C(R2)=534t, and U(R2)=532t. Other triangulations are possible using shadow rays drawn using straight triangulation.

The lower image of FIG. 5 shows shadow 500 with shadow rays 530a-530t emitted from umbra (Um) 510 toward convex hull 380. This technique of drawing shadow rays from shadow centroid 514 toward penumbra (Pn) 512 is termed "nearest triangulation" herein. In nearest triangulation, a set of points P={P1, P2 . . . } on convex hull 380 can be selected. Then, for each point in P, a nearest point on umbra 350, NP(P) can be determined, and a shadow ray can be drawn from NP(P) through P. The lower image of FIG. 5 shows shadow rays drawn using the nearest triangulation technique.

The penumbra of shadow 500 can be triangulated based on shadow rays drawn using the nearest triangulation technique. For shadow ray R drawn using nearest triangulation, let P(R) be a point on convex hull intersecting R and let NP(P(R)) be the nearest point on umbra 350 to P(R).

Then, for a successive pair of rays, R1 and R2, first determine if R1 and R2 share a nearest point; that is, determine whether NP(P(R1)) equals NP(P(R2)). If NP(P(R1)) differs from NP(P(R2)), a pair of triangles can be drawn to triangulate the portion of the penumbra between rays R1 and R2—one triangle T1 using points P(R1), NP(P(R1)), and NP(P(R2)), and another triangle T2 from points P(R1), P(R2), and NP(P(R2)). For example, inset 550 of FIG. 5 shows portions of rays 552 and 554. In inset 540, points P(R) on convex hull 380 for respective rays 552, 554 are shown as points 552a, 554a, and points NP(P(R)) on the outer edge of umbra 350 for respective rays 552, 554 are shown as points 552b, 554b. In the example, let R1 be ray 552 and let R2 be ray 554. Then, T1 556 can be drawn between P(R1)=P 552a, NP(P(R1))=NP 552b, and NP(P(R2))=554b, and T2 544 can be drawn between P(R1)=P 552a, P(R2)=P 554a, and NP(P(R2))=NP 554b.

Otherwise, NP(P(R1)) is the same as NP(P(R2)). Then, one triangle T can be drawn for a pair of successive shadow rays, R1 and R2, using three points: NP(P(R1)), P(R1) and P(R2). The lower image of FIG. 5 shows nearest point 560 shared by six rays: rays 562, 564, 566, 568, 570, and 572. As an example, let R1 be ray 568, and R2 be ray 570. For this example, FIG. 5 shows that triangle (T) 574 can be drawn using NP(P(R1)), which is nearest point 560, P(R1), which is point P 568a, and P(R2), which is P 570a. Other triangulations are possible using shadow rays drawn using nearest triangulation.

Figure 6:
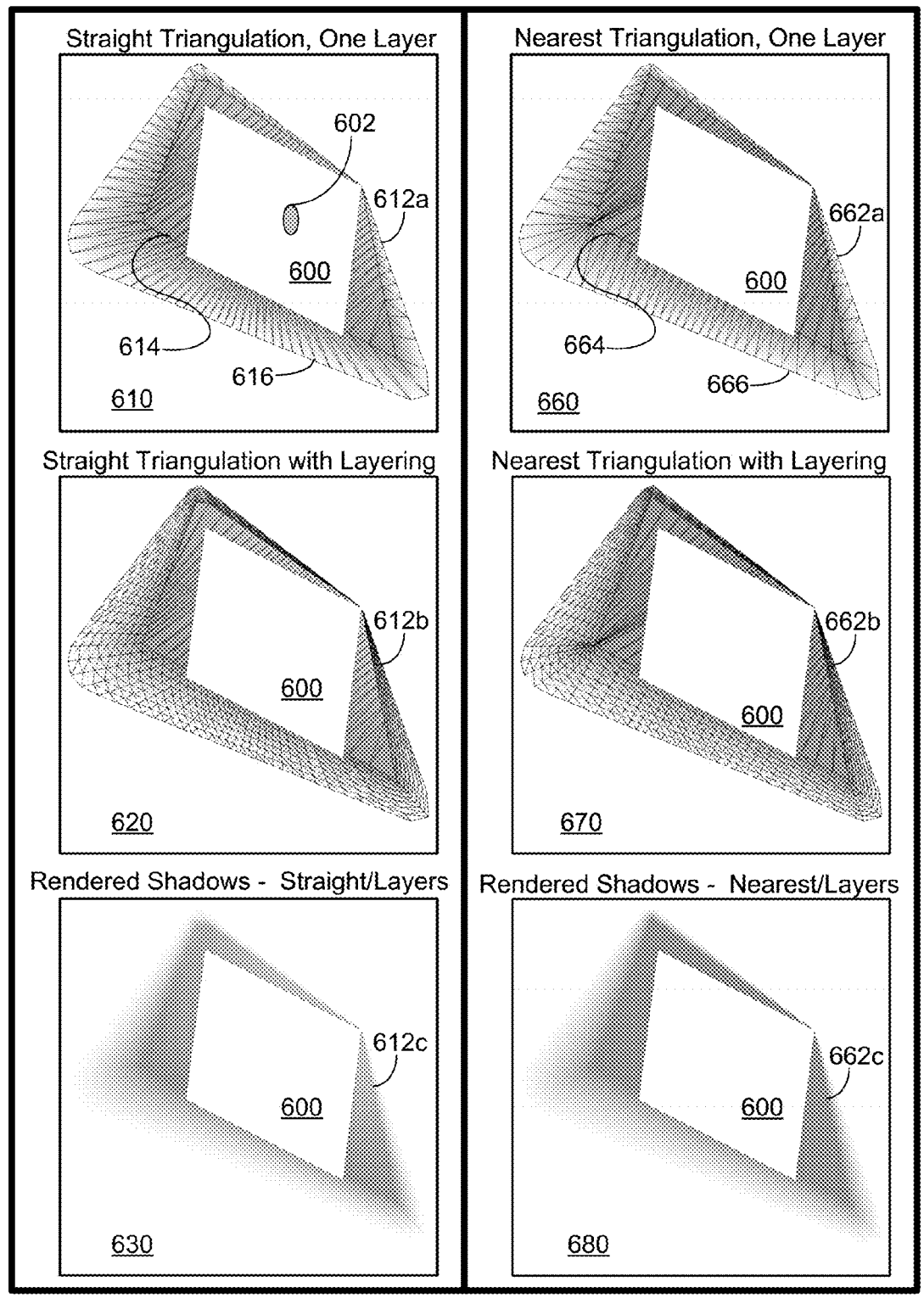
FIG. 6 depicts triangulation techniques related to shadows, in accordance with an embodiment.

FIG. 6 depicts triangulation techniques related to shadows, in accordance with an embodiment. FIG. 6 has two columns of three images—the left column of FIG. 6 shows images 610, 620, 630 related to straight triangulation, and the right column shows images 660, 670, 680 related to nearest triangulation. All six images 610, 620, 630, 660, 670, 680 are images of a shadow of occluding object 600, where the shadow is generated using method 100. In images 610, 620, and 630, shadow rays are drawn from image centroid 602 through umbra 614 toward convex hull 616 to make a straight triangulation for shadow 612a, 612b, and 612c. In images 660, 670, and 680, shadow rays are drawn from nearest points on umbra 614 toward convex hull 666 to make a nearest triangulation for shadow 662a, 662b, and 662c.

In the straight triangulation (or left) column of images in FIG. 6, image 610 shows an example straight triangulation for shadow 612a with one penumbra layer, image 620 shows an example straight triangulation for shadow 612b with eight penumbra layers, and image 630 shows occluding object 600 rendered with shadow 612c, where shadow 612c was rendered using the triangulation shown with shadow 612b.

In the nearest triangulation (or right) column of images in FIG. 6, image 660 shows an example nearest triangulation for shadow 662a with one penumbra layer, image 670 shows an example straight triangulation for shadow 662b with eight penumbra layers, and image 680 shows occluding object 600 rendered with shadow 662c, where shadow 662c was rendered using the triangulation shown with shadow 662b.

In some embodiments, an occluding object can be projected to a background surface as a polygon. For example, let $O_1$ be an occluding object of background surface $B_1$ where $O_1$ is projected onto $B_1$ as an occluding object polygon $OP_1$. In cases where $OP_1$ is opaque, drawing of a shadow under $OP_1$ can lead to "overdrawing" or drawing both the shadow under $OP_1$ and drawing of opaque $OP_1$. Since $OP_1$ is opaque, the shadow under $OP_1$ cannot be seen and so computational resources are wasted for this overdrawing. To alleviate overdrawing in this situation, an intersection $I_1$ of $OP_1$ with an umbra polygon can be calculated. Then, during shadow triangulation, regardless of whether the shadow is ambient or is based upon by a light source, only triangles outside the intersection $I_1$ are generated.

For example, images 620 and 670 of FIG. 6 (as well as the other images in FIG. 6) show occluding object 600 without triangles; that is, occluding object 600 may not be triangulated. Then, if occluding object 600 is opaque and represents the occluding object polygon, shadows in the region of occluding object 600 shown in images 620 and 670 may be omitted from triangulation as being in the intersection of the umbra polygon and the occluding object polygon. In some embodiments, if occluding object 600 is opaque and represents the occluding object polygon, the intersection of the umbra polygon and the occluding object polygon may be omitted from triangulation.

Figure 7A:
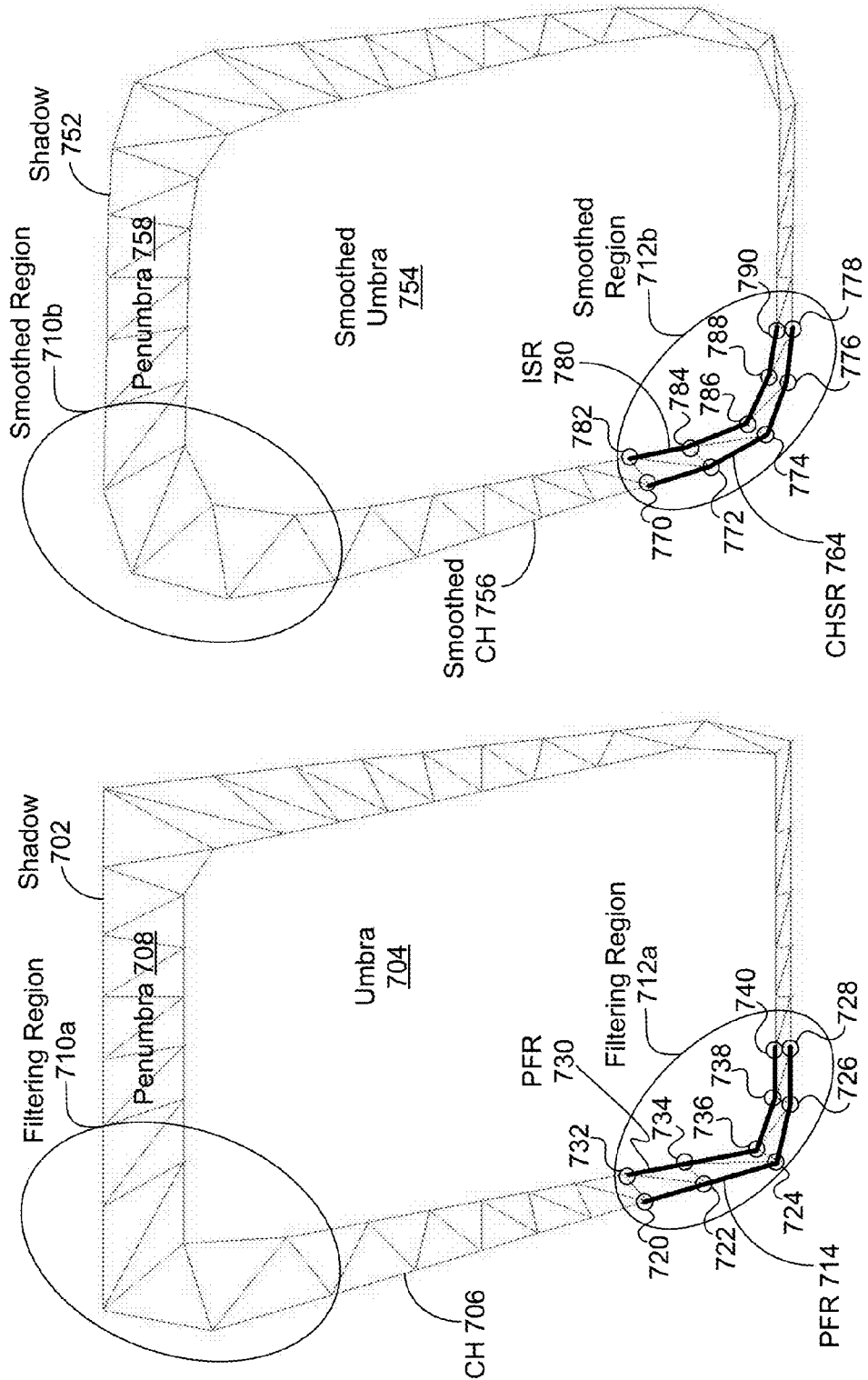
FIG. 7A depicts smoothing of shadows, in accordance with an embodiment.

FIG. 7A depicts smoothing of shadows, in accordance with an embodiment. The left image of FIG. 7A shows an example umbra 704 and penumbra 708 generated using method 100. Filtering regions 710a, 712a encircle portions of umbra 704 and penumbra 708 that are candidate regions for smoothing. Smoothing can be performed by using a filter, such as a low pass filter over points on an outer edge of umbra 704 and/or penumbra 708 (that is, points on a convex hull used to represent shadow 702).

For example, a slope of a line segment between two successive points can be determined; e.g., for successive points P1=(x1, y1) and P2=(x2, y2), the slope of a line segment between P1 and P2 can be determined as slope=(y2−y1)/(x2−x1). Then, a low pass filter can be run over the slope values to determine if points P1 and P2 are to be included as part of filtering region. For example, let P1, P2, and P3 be successive points on the outer edge of umbra 704 (or penumbra 708). Further, let Slope12 be the slope of a line segment between P1 and P2, and Slope23 be the slope of a line segment between P2 and P3. Then, if a difference between Slope23 and Slope12 exceeds a threshold value TV; then points P1, P2, and P3 can be used to create (or be added to) a filtering region. In other words, since the difference between Slope23 and Slope12 exceeds a threshold value TV, the points P1, P2, and P3 were filtered out by the low-pass filter from umbra 704 (or penumbra 708) into a filtering region.

Filtering region 712a includes penumbra filtering region (PFR) 714 with five points 720, 722, 724, 726, 728 from an outer edge of penumbra 708 and umbra filtering region (UFR) 730 with five points 732, 734, 736, 738, 740 from an outer edge of umbra 704. Some or all of points 732, 734, 736, 738, 740 of umbra filtering region 730 (or points 720, 722, 724, 726, 728 of penumbra filtering region 714) can be moved to ensure that all points are not filtered out by the low-pass filter. That is, differences in slopes of line segments using points in a filtering region can be reduced by moving some or all of the points, having an effect of smoothing out curves created or suggested by the line segments within the filtering region. In some examples, additional points can be added to a filtering region if necessary for smoothing.

The right image of FIG. 7A shows shadow 752, which is equivalent to shadow 702, However, shadow 752 has smoothed umbra 754 and smoothed penumbra 758 that have been smoothed within at least smoothing regions 710b (corresponding to filtering region 710a) and 712b (corresponding to filtering region 712a). FIG. 7A shows that curves suggested by line segments within smoothed regions 710b, 712b look more rounded; i.e., smoother, than in corresponding respective filtering regions 710a, 712a. For example, in smoothed region 712b, point 786 has been moved rightwards and slightly upwards relative to corresponding point 736 in filtering region 712a. Movement of point 786 has the effect of decreasing the difference between a slope of a line segment connecting points 784 and 786 and of a slope of a line segment connecting points 786 and 788.

Figure 7B:
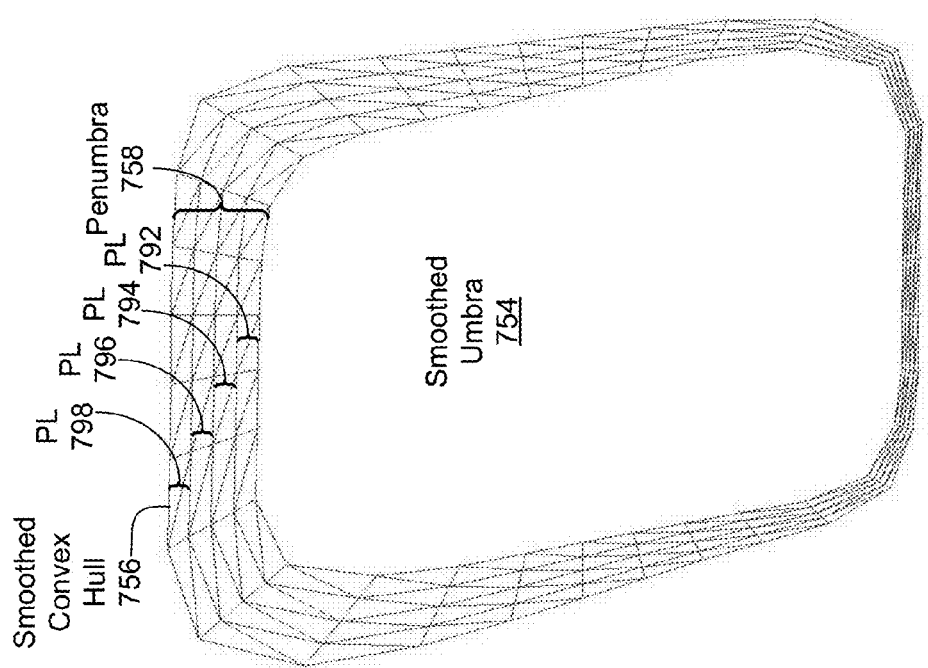
FIG. 7B depicts layering of smoothed shadows, in accordance with an embodiment.

Smoothing and penumbra layering can be combined. For example, FIG. 7B shows shadow 752 with smoothed umbra 754, smoothed convex hull 756, and penumbra 758 as shown in the right image of FIG. 7A. In FIG. 7B, however, penumbra 758 is shown with four penumbra layers (PLs) 792, 794, 796, and 798.

Figure 8:
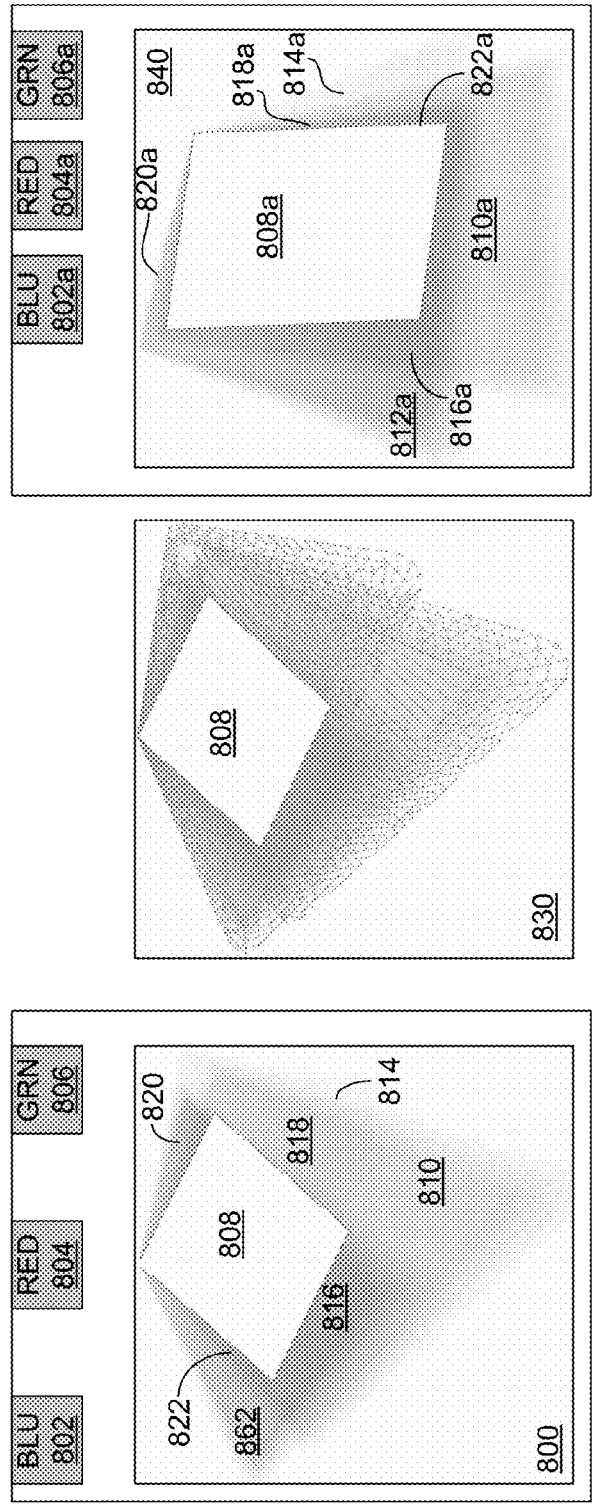
FIG. 8 depicts shadows from multiple light sources, in accordance with an embodiment.

FIG. 8 depicts shadows from multiple light sources, in accordance with an embodiment. Images 800, 830 of FIG. 8 each show shadows of occluding object 808 generated by three light sources 802, 804, 806. For images 800, 830, light source 802 is above and generally left of occluding object 808, as indicated by a position of "BLU" light source 802 with respect to image 800, light source 804 is generally directly above occluding object 808, as indicated by a position of "RED" light source 804 with respect to image 800, and light source 806 is above and generally right of occluding object 808, as indicated by a position of "GRN" light source 806 with respect to image 800.

Each light source 802, 804, 806 is configured to emit different colors of light. For example, light source 802 is configured to emit blue light; e.g., light whose color can be represented by RGB triple (0, 0, 255), light source 804 is configured to emit red light; e.g., light whose color can be represented by RGB triple (255, 0, 0), and light source 806 is configured to emit green light; e.g., light whose color can be represented by RGB triple (0, 255, 0). Further, as shown in images 800, 830, the background surface has a white color representable by RGB triple (255, 255, 255).

As indicated above, the color of a shadow C1 cast by an occluding object O upon a background surface B1 having color BC, where O occludes light from a light source LS having color LSC is: C1=BC−LC. Table 1 below summarizes occlusion of one or more of light sources 802, 804, and 806 by object 808 to generate numbered shadows in image 800.

TABLE 1

| Light Source(s) LS | Combined Light Source Color(s) LSC | Shadow Color C1 | Image 800 Shadow # |
|---|---|---|---|
| 802 | Red (255, 0, 0) | Cyan (0, 255, 255) | 810 |
| 804 | Green (0, 255, 0) | Magenta (255, 0, 255) | 812 |
| 806 | Blue (0, 0, 255) | Yellow (255, 255, 0) | 814 |
| 802 & 804 | Yellow | Blue | 816 |
| 802 & 806 | Magenta | Green | 818 |
| 804 & 806 | Cyan | Red | 820 |
| 802 & 804 & 806 | White | Black | 822 |

Image 830 shows three layered triangulations of shadows cast by occluding object 808 of light from light sources 802, 804, 806 used to generate image 800. Light sources and/or occluding objects can be moved to generate different shadows. For example, to generate image 840, occluding object 808 of image 800 can be moved to position 808a shown in image 840. Light sources 802, 804, 806 can be moved to positions 802a, 804a, 806a shown in FIG. 8 with respect to image 840 in a similar fashion to how light sources 802, 804, 806 are shown with respect to image 800. As such, shadows in image 840 have different sizes and orientations than shown in image 800.

Table 2 below summarizes occlusion of light sources 802a, 804a, and 806a that generate shadows 810a-822a of image 840.

TABLE 2

| Light Source(s) LS | Combined Light Source Color(s) LSC | Shadow Color C1 | Image 840 Shadow # |
|---|---|---|---|
| 802a | Red | Cyan | 810a |
| 804a | Green | Magenta | 812a |
| 806a | Blue | Yellow | 814a |
| 802a & 804a | Yellow | Blue | 816a |
| 802a & 806a | Magenta | Green | 818a |
| 804a & 806a | Cyan | Red | 820a |
| 802a & 804a & 806a | White | Black | 822a |

In some embodiments, importance of an object can be conveyed using a number of light sources. For example, an application can use one light source, or ambient lighting, for ordinary objects, and use one or more light sources to illuminate an object designated as important. In one example, an application can have an active object; e.g., an object currently being used, and inactive objects or objects awaiting use. To draw shadows for this application, two light sources can be used: a first non-moving light source for drawing shadows of inactive objects and a second light source that tracks the active object. Properties of two light sources can differ as well; for example, the first light source can emit light having a different color, intensity (e.g., be dimmer), Z dimension (e.g., be farther away) than the second light source. In another example, shadows drawn using an ambient lighting model, such as discussed above in the context of FIG. 4, can take the place of the first light source.

In cases where multiple important objects have been designated, more light sources can be added. To continue the example of the above application, suppose that information can be copied from a source object to a destination object as part of the application as follows: a user can designate information to be copied from an active source object, select a destination object, and then indicate that the information to be copied is to be placed in the destination object; e.g., copying files between windows, or data between fields in a form, or between cells of a spreadsheet. Then, during a copy scenario, at least two important objects can be designated—the source object and the destination object. The source object can be illuminated and shadows drawn using a "source" light source and a destination object can be illuminated and shadows drawn using a "destination" light source. Once the copy operation is complete, the "source" light source can be removed, as the source object no longer retains its previous importance.

Figure 9:
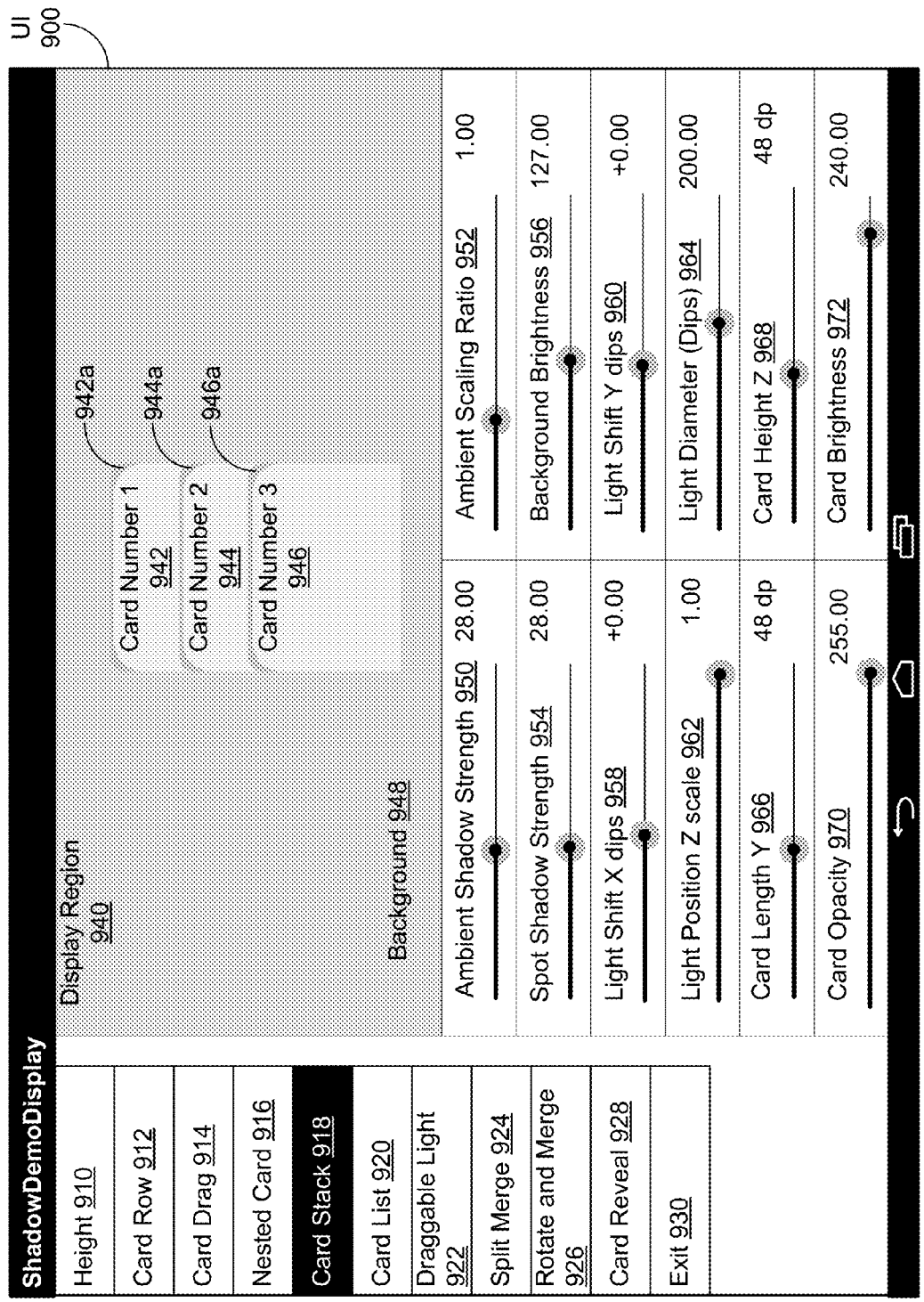
FIG. 9 depicts a GUI related to shadows, in accordance with an embodiment.

FIG. 9 depicts GUI 900 related to shadows, in accordance with an embodiment. GUIs 900 can be provided using computer-readable instructions executed by one or more processors of a computing device, such as computing device 1200. The computer-readable instructions can be instructions for a software application that generates GUI 900. GUI 900 includes control buttons 910, 912, 914, 916, 918, 920, 922, 924, 926, 928, and 930, display region 940, and parameter controls 950, 952, 954, 956, 958, 960, 962, 964, 966, 968, 970, and 972.

Each of control buttons 910-930, when selected, indicates a type of shadow simulation to be displayed in display region 940. For example, card stack control button 918 is shown in FIG. 9 with a black color, while the other control buttons 910-916 and 920-930 are each shown with a white color, to indicate that card stack control button 918 has been selected.

As card stack control button 918 has been selected, a group, or stack, of three cards 942, 944, and 946 are displayed in display region 940. Each card is display region 940 displayed with a corresponding shadow. FIG. 9 shows card 942 with shadow 942a cast upon background 948 of display region 940, card 944 with shadow 944a cast upon card 942 to indicate card 944 is atop card 942, and card 946 with shadow 946a cast upon card 944 to indicate card 946 is atop card 944. In some examples, objects displayed in display region 940, such as cards 942, 944, 946 can be modified; e.g., an object can be resized, recolored, deleted, inserted, etc. via controls (not shown in FIG. 9) available by selecting an object or background 948 and using a "right-click" menu or similar control.

Selections of control buttons can enable parameter controls, such as via selection of control button 910 to enable card height selection, select a card configuration, such as selections of control button 912 for a card row, control button 914 for a dragging card simulation, control button 916 for a nested card arrangement, control button 918 for a stack of cards, and control button 920 for a list of cards. Selection of control button 922 allows placement of a light source and selections of control buttons 924, 926, and 928 allow for various card animations, such as splitting and merging a group of cards by selection of control button 924, rotating and merging a group of cards by selection of control button 926, and revealing cards within a group of cards by selection of control button 928. Exit control button 930 can be used to close GUI 900 and perhaps terminates an application providing GUI 900.

Other control buttons can be provided, such as but not limited to, control buttons to enable selection and positioning of multiple light sources, controlling colors of light emitted by light sources, changing orientation of display region in 3-D space, specifying occluding object polygons other than cards, changing triangulation techniques associated with shadows, and changing convex representations for the outer edge of the umbra/penumbra (e.g., a convex hull representation or a smoothed convex hull representation).

Parameter control 950 can control strength, or darkness, of shadows caused by occlusion of ambient light, such as discussed above regarding FIG. 4. In the example of GUI 900, ambient shadow strength parameter control 950 can range from 0 for no ambient shadows to 255 for strongest ambient shadows. FIG. 9 shows ambient shadow strength parameter control 950 set to 28 for relatively light ambient shadows.

Parameter control 952 can control a ratio between strength of shadows cast by occlusion of ambient light and strength of shadows cast by occlusion of light from light sources. FIG. 9 shows ambient scaling ratio parameter control 952 set to 1.00 to indicate equal strength for shadows cast based on ambient light to shadows cast based on light from light sources. For GUI 900, ambient scaling ratio parameter control 952 can range from 0.2 to 4.2.

Parameter control 954 can control strength of shadows caused by occlusion of light emitted by light sources, such as discussed above regarding FIGS. 1-3. In the example of GUI 900, spot shadow strength parameter control 954 can range from 0 for no light source shadows to 255 for strongest light source shadows. FIG. 9 shows spot shadow strength parameter control 954 set to 28 for relatively light source shadows.

Parameter control 956 can control a color of background 948 of display region 940. In the example of GUI 900, background brightness parameter control 956 can specify a grey scale value that ranges from 0 for a black background to 255 for a white background. FIG. 9 shows background brightness parameter control 956 set to 127 for a grey background. In other embodiments, additional parameter controls can be used to specify color value (e.g., an RGB triple) for coloring background 948.

Parameter controls 958 and 960 can control position of a light source in respective X and Y dimensions. In the example of GUI 900, a light source is initially considered to be centered over display region 950. By changing light shift X parameter control 958, the light source can be moved in the X dimension (horizontally) and by changing light shift Y parameter control 960, the light source can be moved in the Y dimension (vertically). FIG. 9 shows both light shift X parameter control 958 and light shift Y parameter control 960 set to +0.00 to indicate no X or Y dimension movement of the light source.

Parameter control 962 can control a position of a light source in a Z (depth) dimension. By increasing (decreasing) light position Z parameter control 962, the light source moves away from (closer to) display region 940 in the Z dimension. Generally, moving a light source closer to a display region makes resulting shadows smaller and more distinct/less diffuse, while moving a light source away from the display region makes resulting shadows larger and less distinct/more diffuse. FIG. 9 shows ambient light position Z parameter control 962 set to 1.00 indicating the light source is as close to display region 940 as GUI 900 will allow.

Parameter control 964 can control a size of a light source. Generally, larger light sources provide less distinct/more diffuse shadows than smaller light sources. FIG. 9 shows light diameter parameter control 964 set to 200 for a moderate sized light source. In other embodiments, GUI 900 can provide more controls over geometry of light sources, such as, but not limited to, providing selections for light source shape (e.g., triangular, rectangular, pentagonal, hexagonal . . . ), light source vertices, and light source orientation/tilt with respect to background 948.

Parameter control 966 can control a size of a card, or occluding object, in a Y (length). In the example of GUI 900, card length Y parameter control 966 can range from 20 for relatively short cards to 100 for relatively long cards. FIG. 9 shows card length Y parameter control 966 set to 48 for moderate sized cards. In other embodiments, an X dimension (width) control can be provided to control the width of a card.

Parameter control 968 can control a height (Z dimension amount) of a card over background 948. In the example of GUI 900, card height Z parameter control 968 can range from 0 for a card being placed directly on background 948 to 100 for a card being relatively high above background 948. Generally, as a card is lifted above a background, shadows of the card become larger and less distinct/more diffuse. FIG. 9 shows card height Z parameter control 968 set to 48 to indicate that a card is moderately high above background 948. In other embodiments, GUI 900 can provide more controls over geometry of cards, such as, but not limited to, providing selections for card shape (e.g., triangular, rectangular, pentagonal, hexagonal . . . ), vertices for an example card, and card orientation/tilt with respect to background 948.

Parameter control 970 can control opacity of a card. In the example of GUI 900, card opacity parameter control 970 can range from 0 a transparent card having no opacity to 255 for a fully opaque card having no transparency. FIG. 9 shows card opacity parameter control 970 set to 255 to indicate cards are fully opaque.

Parameter control 972 can control a color of a card in display region 940. In the example of GUI 900, card brightness parameter control 972 can specify a grey scale value that ranges from 0 for a black card to 255 for a white card. FIG. 9 shows card brightness parameter control 972 set to 240 for relatively light-colored cards. In some embodiments, additional parameter controls can be used to specify color value (e.g., an RGB triple) for coloring a card, and to specify different colors for different cards.

Additional parameters can be controlled as well, such as a parameter controlling whether a card (or cards) are fixed while a mobile device/background surface changes orientation or move with the background surface, a parameter controlling whether a light source (or light sources) are fixed while a mobile device/background surface changes orientation or move with the background surface. Many other parameters and corresponding controls are possible as well.

FIG. 10 depicts two GUIs 1010a, 1010b each displaying a pattern of overlapping rectangles, in accordance with an embodiment. Each of GUIs 1010a, 1010b can be provided using computer-readable instructions executed by one or more processors of a computing device, such as computing device 1200.

GUI 1010a displays five rectangles 1012a, 1014a, 1016a, 1018a, 1020a on background 1030a. GUI 1010b also displays five rectangles 1012b, 1014b, 1016b, 1018b, 1020b on background 1030a, where a pattern of rectangles 1012a-1020a displayed by GUI 1010a is the same as a pattern of rectangles 1012b-1020b displayed by GUI 1010a. Each rectangle 1012a, 1014a, 1016a, 1018a, 1020a displayed by GUI 1010a has a corresponding respective rectangle 1012b, 1014b, 1016b, 1018b, 1020b displayed by GUI 1010b. As shown in FIG. 10, corresponding rectangles are displayed with the same size, color, and relative position by both GUIs 1010a and 1010b. For example, GUI 1010a displays rectangle 1012a as a white rectangle directly atop rectangles 1014a, 1016a, 1020a, and indirectly atop rectangle 1018a. Similarly, GUI 1010b displays rectangle 1012b as a white rectangle having the same size as rectangle 1012a and same position directly atop rectangles 1014b, 1016b, 1020b, and indirectly atop rectangle 1018b.

However, GUI 1010b also displays shadow 1022b for rectangle 1012b to provide an additional depth cue to a viewer of GUI 1010b that rectangle 1012b is atop the other rectangles. FIG. 10 shows that shadow 1022b uses background 1030b, and rectangles 1014b, 1016b, and 1020b as background surfaces. Further, GUI 1010b also displays shadows 1024b, 1026b, 1028b, and 1030b for respective rectangle 1014b, 1016b, 1018b, and 1020b to provide additional depth cues to a viewer of GUI 1010b of the relative positions of rectangles displayed by GUI 1010b.

In some embodiments, one or more of rectangles 1012b, 1014b, 1016b, 1018b, 1020b can be a display generated by an operating system and/or an application running on a computing device providing GUI 1010b. Then, as a display rectangle is selected by a user of GUI 1010b, GUI 1010b can make the selected rectangle appear to be on top of the other rectangles and can draw a shadow for the selected rectangle atop the some or all of the other rectangles. For example, if rectangle 1016b were selected for display by the user, GUI 1010b can make rectangle 1016b appear to be atop rectangles 1012b, 1014b, 1018b, 1020b, and draw corresponding shadow 1026b atop rectangles 1012b, 1014b, 1018b, 1020b as well.

Figure 11:
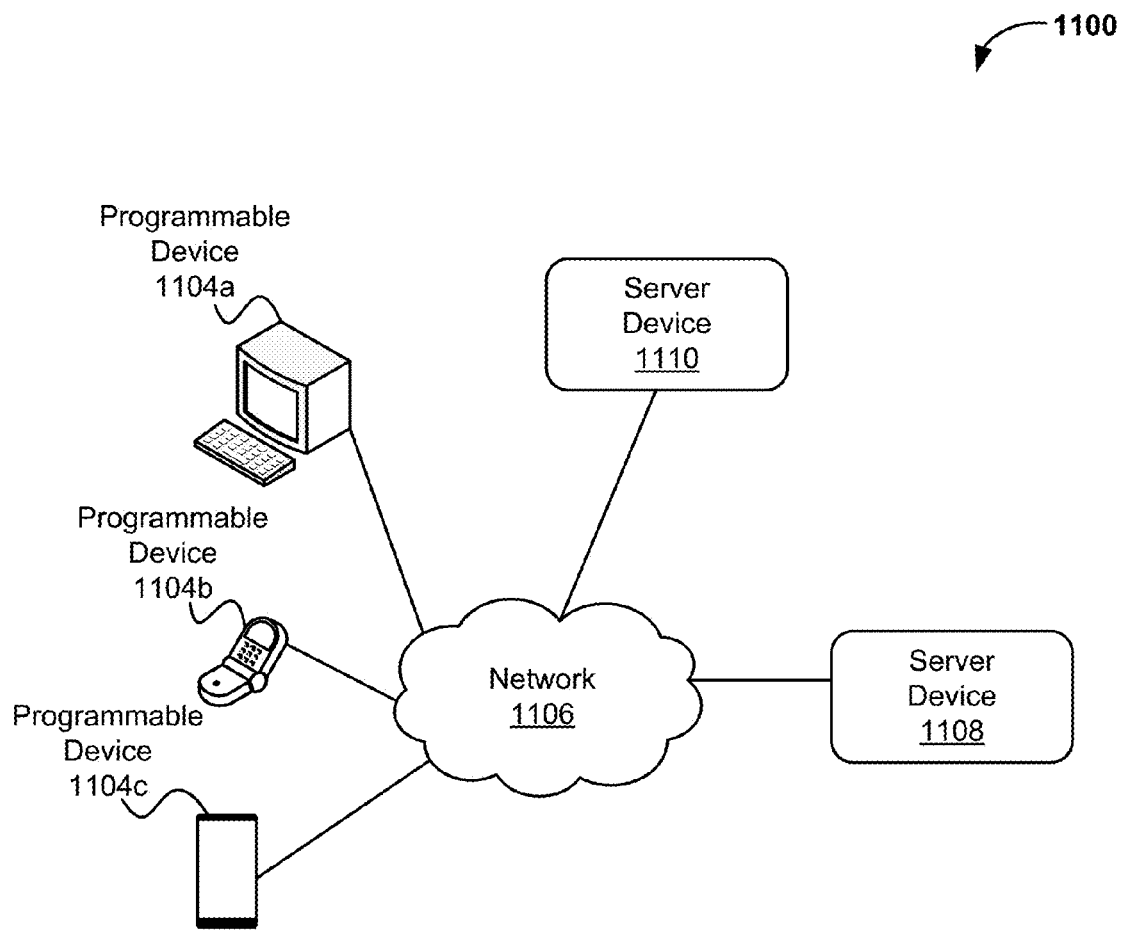
FIG. 11 depicts a distributed computing architecture, in accordance with an example embodiment.

In another example, a pattern including other convex polygons, such as triangles, hexagons, pentagons, squares, and so on can be drawn by GUI 1010b with shadowed polygons similar to rectangle 1012b shadowed by shadow 1022b. In other examples, other applications than GUI 1010b can use the herein-described techniques to draw shadows of convex polygons from light emitted by polygonal light sources; e.g., a music application can draw a collection of polygonal images, such as images related to album or CD covers, to represent a collection of songs. The application can draw a top-most image of the collection of images to represent being a song currently being played. Then, the application can use the herein-described techniques to add shadows to the collection of images to add depth cues and aid a user of the application determine which image corresponds to the song currently being played. Many other examples of shadowed polygons drawn by a GUI, such as GUI 1010b, and/or applications are possible as well Example Data Network FIG. 11 shows server devices 1108, 1110 configured to communicate, via network 1106, with programmable devices 1104a, 1104b, and 1104c. Network 1106 may correspond to a LAN, a wide area network (WAN), a corporate intranet, the public Internet, or any other type of network configured to provide a communications path between networked computing devices. The network 1106 may also correspond to a combination of one or more LANs, WANs, corporate intranets, and/or the public Internet.

Although FIG. 11 only shows three programmable devices, distributed application architectures may serve tens, hundreds, or thousands of programmable devices. Moreover, programmable devices 1104a, 1104b, and 1104c (or any additional programmable devices) may be any sort of computing device, such as an ordinary laptop computer, desktop computer, network terminal, wireless communication device (e.g., a cell phone or smart phone), and so on. In some embodiments, programmable devices 1104a, 1104b, and 1104c may be dedicated to the design and use of software applications. In other embodiments, programmable devices 1104a, 1104b, and 1104c may be general purpose computers that are configured to perform a number of tasks and need not be dedicated to software development tools.

Server devices 1108, 1110 can be configured to perform one or more services, as requested by programmable devices 1104a, 1104b, and/or 1104c. For example, server device 1108 and/or 1110 can provide content to programmable devices 1104a-1104c. The content can include, but is not limited to, web pages, hypertext, scripts, binary data such as compiled software, images, audio, and/or video.

The content can include compressed and/or uncompressed content. The content can be encrypted and/or unencrypted. Other types of content are possible as well.

As another example, server device 1108 and/or 1110 can provide programmable devices 1104a-1104c with access to software for database, search, computation, graphical, audio, video, World Wide Web/Internet utilization, and/or other functions. Many other examples of server devices are possible as well.

Computing Device Architecture

Figure 12A:
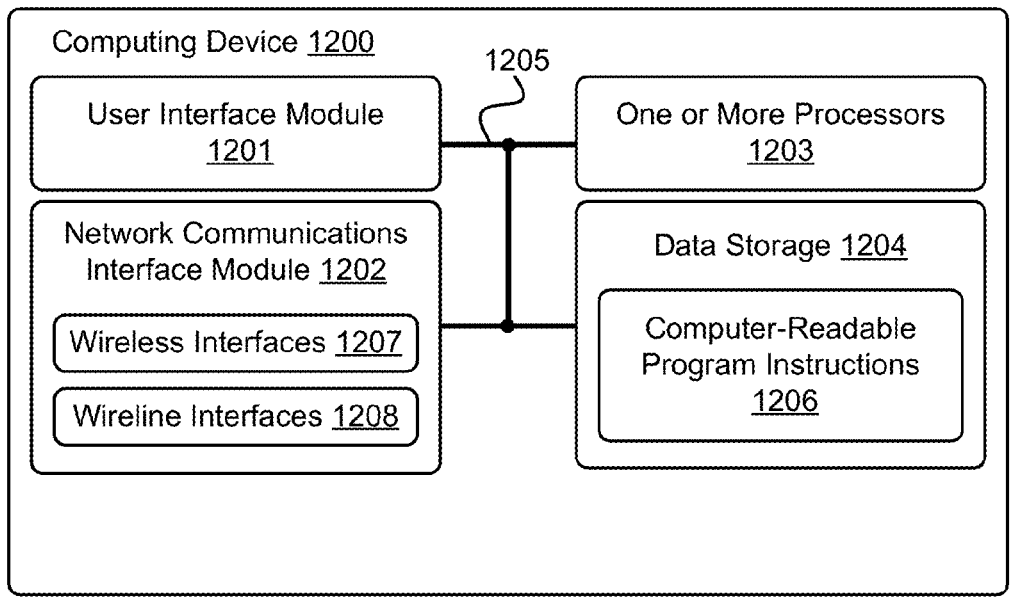
FIG. 12A is a block diagram of a computing device, in accordance with an example embodiment.

FIG. 12A is a block diagram of computing device (e.g., system) 1200 in accordance with an example embodiment. In particular, computing device 1200 shown in FIG. 12A can be configured to perform one or more functions of GUI 900, GUI 1000, programmable device 1104a, programmable device 1104b, programmable device 1104c, network 1106, and/or server device 1108. Computing device 1200 may include a user interface module 1201, a network-communication interface module 1202, one or more processors 1203, and data storage 1204, all of which may be linked together via a system bus, network, or other connection mechanism 1205.

User interface module 1201 can be operable to send data to and/or receive data from external user input/output devices. For example, user interface module 1201 can be configured to send and/or receive data to and/or from user input devices such as a keyboard, a keypad, a touch screen, a computer mouse, a track ball, a joystick, a camera, a voice recognition module, and/or other similar devices. User interface module 1201 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 1201 can also be configured to generate audible output(s), such as a speaker, speaker jack, audio output port, audio output device, earphones, and/or other similar devices.

Network-communications interface module 1202 can include one or more wireless interfaces 1207 and/or one or more wireline interfaces 1208 that are configurable to communicate via a network, such as network 1106 shown in FIG. 11. Wireless interfaces 1207 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 1208 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 1202 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 1203 can include one or more general purpose processors and/or one or more special purpose processors (e.g., digital signal processors, application specific integrated circuits, etc.). Processors 1203 can be configured to execute computer-readable program instructions 1206 that are contained in the data storage 1204 and/or other instructions as described herein.

Data storage 1204 can include one or more computer-readable storage media that can be read and/or accessed by at least one of processors 1203. The one or more computer-readable storage media can include volatile and/or non-volatile storage components, such as optical, magnetic, organic or other memory or disc storage, which can be integrated in whole or in part with at least one of processors 1203. In some embodiments, data storage 1204 can be implemented using a single physical device (e.g., one optical, magnetic, organic or other memory or disc storage unit), while in other embodiments, data storage 1204 can be implemented using two or more physical devices. The one or more computer-readable storage media can be, or can include, one or more non-transitory computer-readable storage media.

Data storage 1204 can include computer-readable program instructions 1206 and perhaps additional data. In some embodiments, data storage 1204 can additionally include storage required to perform at least part of the herein-described methods and techniques, such as but not limited to methods 100 and 1300, and/or at least part of the functionality of the herein-described GUIs, devices and networks.

Cloud-Based Servers

Figure 12B:
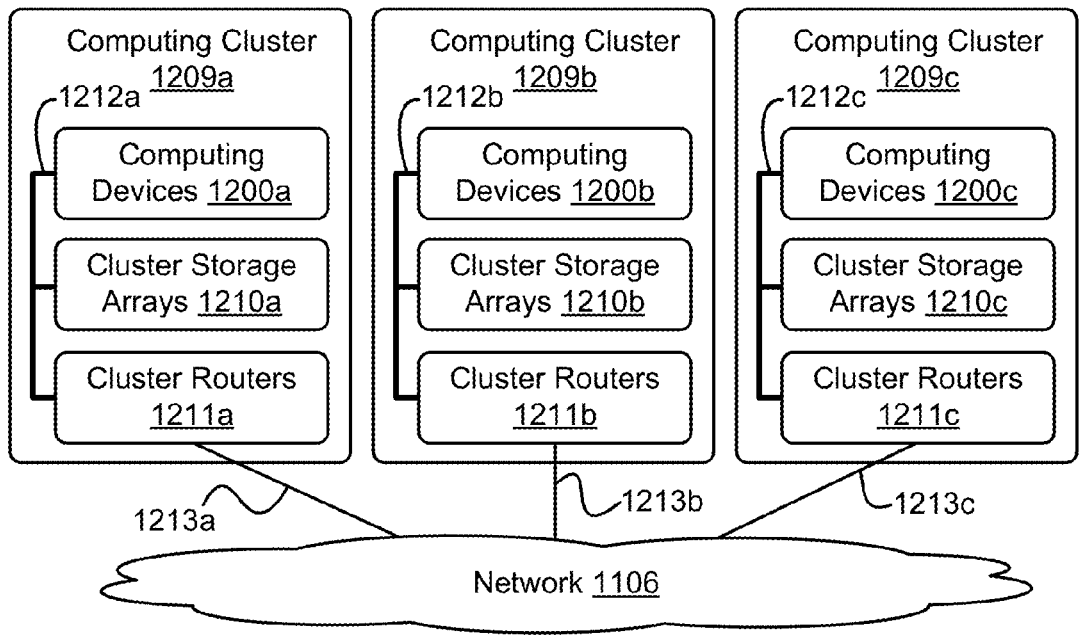
FIG. 12B depicts a cloud-based server system, in accordance with an example embodiment.

FIG. 12B depicts a network 1106 of computing clusters 1209a, 1209b, 1209c arranged as a cloud-based server system in accordance with an example embodiment. Server devices 1108 and/or 1110 can be cloud-based devices that store program logic and/or data of cloud-based applications and/or services. In some embodiments, server devices 1108 and/or 1110 can be a single computing device residing in a single computing center. In other embodiments, server device 1108 and/or 1110 can include multiple computing devices in a single computing center, or even multiple computing devices located in multiple computing centers located in diverse geographic locations. For example, FIG. 11 depicts each of server devices 1108 and 1110 residing in different physical locations.

In some embodiments, data and services at server devices 1108 and/or 1110 can be encoded as computer readable information stored in non-transitory, tangible computer readable media (or computer readable storage media) and accessible by programmable devices 1104a, 1104b, and 1104c, and/or other computing devices. In some embodiments, data at server device 1108 and/or 1110 can be stored on a single disk drive or other tangible storage media, or can be implemented on multiple disk drives or other tangible storage media located at one or more diverse geographic locations.

FIG. 12B depicts a cloud-based server system in accordance with an example embodiment. In FIG. 12B, the functions of server device 1108 and/or 1110 can be distributed among three computing clusters 1209a, 1209b, and 1209c. Computing cluster 1209a can include one or more computing devices 1200a, cluster storage arrays 1210a, and cluster routers 1211a connected by a local cluster network 1212a. Similarly, computing cluster 1209b can include one or more computing devices 1200b, cluster storage arrays 1210b, and cluster routers 1211b connected by a local cluster network 1212b. Likewise, computing cluster 1209c can include one or more computing devices 1200c, cluster storage arrays 1210c, and cluster routers 1211c connected by a local cluster network 1212c.

In some embodiments, each of the computing clusters 1209a, 1209b, and 1209c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1209a, for example, computing devices 1200a can be configured to perform various computing tasks of server 1108. In one embodiment, the various functionalities of server 1108 can be distributed among one or more computing devices 1200a, 1200b, and 1200c. Computing devices 1200b and 1200c in respective computing clusters 1209b and 1209c can be configured similarly to computing devices 1200a in computing cluster 1209a. On the other hand, in some embodiments, computing devices 1200a, 1200b, and 1200c can be configured to perform different functions.

In some embodiments, computing tasks and stored data associated with server devices 1108 and/or 1110 can be distributed across computing devices 1200a, 1200b, and 1200c based at least in part on the processing requirements of server devices 1108 and/or 1110, the processing capabilities of computing devices 1200a, 1200b, and 1200c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 1210a, 1210b, and 1210c of the computing clusters 1209a, 1209b, and 1209c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 1108 and/or 1110 can be distributed across computing devices 1200a, 1200b, and 1200c of computing clusters 1209a, 1209b, and 1209c, various active portions and/or backup portions of these components can be distributed across cluster storage arrays 1210a, 1210b, and 1210c. For example, some cluster storage arrays can be configured to store the data of server device 1108, while other cluster storage arrays can store data of server device 1110. Additionally, some cluster storage arrays can be configured to store backup versions of data stored in other cluster storage arrays.

The cluster routers 1211a, 1211b, and 1211c in computing clusters 1209a, 1209b, and 1209c can include networking equipment configured to provide internal and external communications for the computing clusters. For example, the cluster routers 1211a in computing cluster 1209a can include one or more internet switching and routing devices configured to provide (i) local area network communications between the computing devices 1200a and the cluster storage arrays 1210a via the local cluster network 1212a, and (ii) wide area network communications between the computing cluster 1209a and the computing clusters 1209b and 1209c via the wide area network connection 1213a to network 1106. Cluster routers 1211b and 1211c can include network equipment similar to the cluster routers 1211a, and cluster routers 1211b and 1211c can perform similar networking functions for computing clusters 1209b and 1209b that cluster routers 1211a perform for computing cluster 1209a.

Example Methods of Operation

Figure 13:
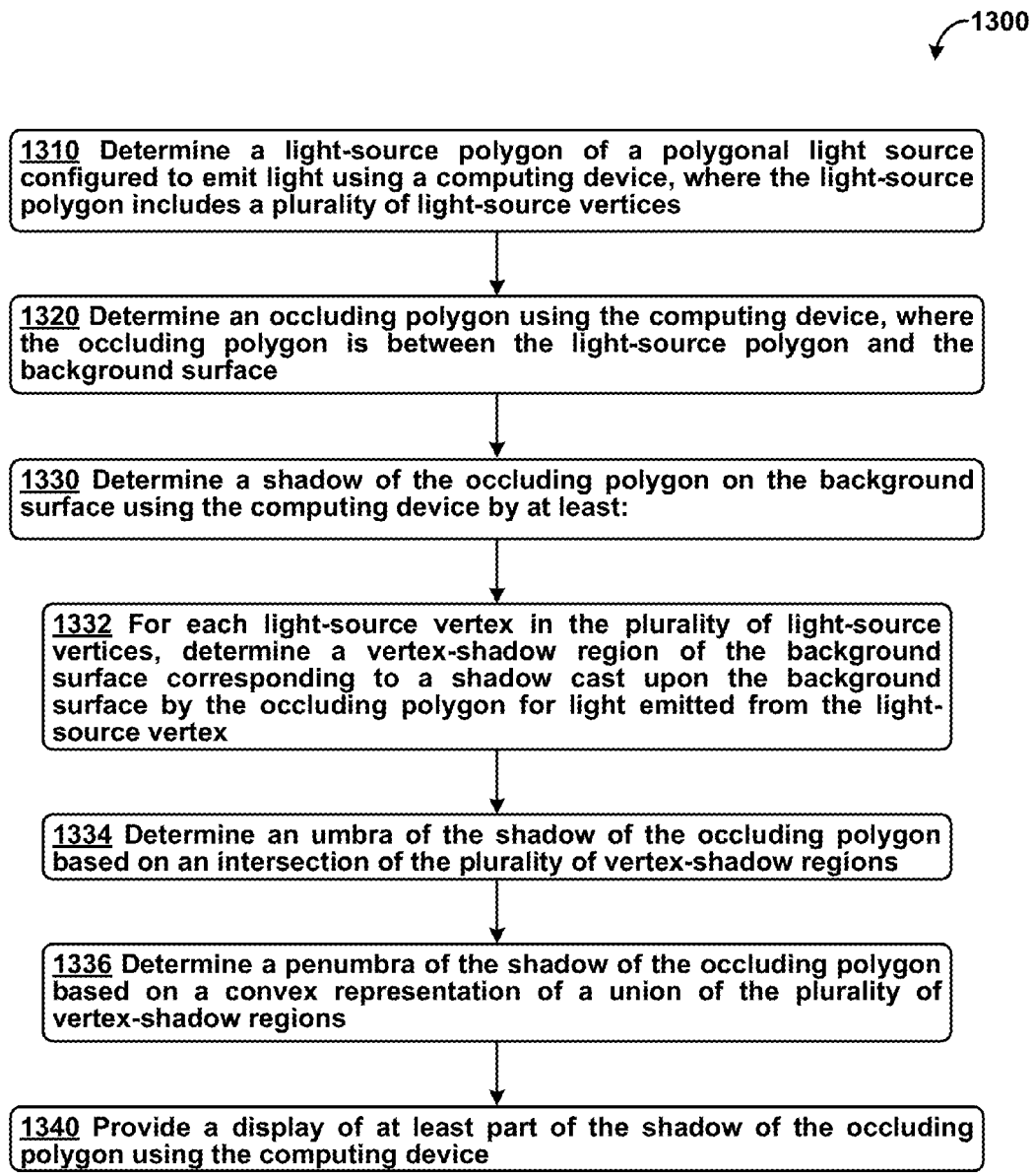
FIG. 13 is a flow chart illustrating a method, in accordance with an embodiment.

FIG. 13 is a flow chart illustrating method 1300, in accordance with an embodiment. Method 200 can be carried out by one or more computing devices, such as, but not limited to, programmable device 1104a, programmable device 1104b, programmable device 1104c, network 1106, server device 1108, computing device 1200, computing cluster 1209a, computing cluster 1209b, and/or computing cluster 1209c.

Method 1300 can begin at block 1310, where a computing device can determine a light-source polygon, such as discussed above in the context of at least FIGS. 1 and 2. The light-source polygon can be for a polygonal light source that is configured to emit light. The light-source polygon can include a plurality of light-source vertices.

At block 1320, the computing device can determine an occluding polygon, where the occluding polygon can be between the light-source polygon and a background surface, such as discussed above in the context of at least FIGS. 1, 2, 8, and 10.

In some embodiments, the occluding polygon can be based upon a rectangle, such as discussed above in the context of at least FIGS. 1-10. For example, the occluding polygon can be a rectangle, a rounded rectangle, a square, a parallelogram, or another polygon based upon a rectangle. In other embodiments, the light-source polygon can be a polygon representing a circle.

At block 1330, the computing device can determine a shadow of the occluding polygon on the background surface using the computing device by at least performing blocks 1342, 1344, and 1346, such as discussed above in the context of at least FIGS. 1-10.

At block 1332, the computing device can, for each light-source vertex in the plurality of light-source vertices, determine a vertex-shadow region of the background surface. The vertex-shadow region can correspond to a shadow cast upon the background surface by the occluding polygon for light emitted from the light-source vertex.

At block 1334, the computing device can determine an umbra of the shadow of the occluding polygon based on an intersection of the plurality of vertex-shadow regions.

At block 1336, the computing device can determine a penumbra of the shadow of the occluding polygon based on a convex representation of a union of the plurality of vertex-shadow regions. In some embodiments, determining the convex representation of the union of the plurality of vertex-shadow regions can include determining a convex hull of the union of the plurality of vertex-shadow regions, such as discussed above in the context of at least FIGS. 1, 3, and 5-8. In particular of these embodiments, determining the convex representation of the union of the plurality of vertex-shadow regions can include generating a smoothed convex hull by at least applying a filter to the convex hull, such as discussed above in the context of at least FIGS. 7A and 7B.

In other embodiments, the shadow of the occluding polygon can include the umbra and the penumbra. Then, determining the shadow of the occluding polygon can include determining a shadow centroid based on a centroid of the umbra and the penumbra and determining a plurality of rays, where each ray of the plurality of rays can start at the shadow centroid and can go in a direction of the penumbra, such as discussed above in the context of at least FIGS. 5 and 6. In particular embodiments, determining the shadow of the occluding polygon can include determining a plurality of polygons representing the penumbra, where the plurality of polygons can be based upon the plurality of rays, such as discussed above in the context of at least FIGS. 5 and 6.

In more particular embodiments, the umbra can be associated with an umbra transparency value, where an outer edge of the penumbra can be associated with a penumbra-outer-edge transparency value, where the umbra transparency value can differ from the penumbra transparency value, and where each of the plurality of polygons representing the penumbra can be associated with a polygon transparency value that can be based on the umbra transparency value and/or the penumbra-outer-edge transparency value, such as discussed above in the context of at least FIGS. 3, 6, 7A, and 7B. In even more particular embodiments, the plurality of polygons representing the penumbra can be arranged into one or more polygon layers, where each polygon in a polygon layer of the one or more polygon layers can be associated with a predetermined transparency value, such as discussed above in the context of at least FIGS. 6, 7A, and 7B.

At block 1340, the computing device can provide a display of at least part of the shadow of the occluding polygon, such as discussed above in the context of at least FIGS. 1, 8, and 10. In some embodiments, providing the display of at least part of the shadow can include providing a display of the occluding polygon and the at least part of the shadow, such as discussed above in the context of at least FIGS. 1, 8, and 10. In particular embodiments, the occluding polygon can be a user-interface element of a GUI. Then, providing the display of at least part of the shadow can include providing a display of the GUI that includes at least part of the occluding polygon and the at least part of the shadow, such as discussed above in the context of at least FIG. 10.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A method, comprising:
   determining a light-source polygon of a polygonal light source configured to emit light using a computing device, wherein the light-source polygon comprises a plurality of light-source vertices;
   determining an occluding polygon using the computing device, wherein the occluding polygon is between the light-source polygon and a background surface;
   determining a shadow of the occluding polygon on the background surface using the computing device by at least:
      for each light-source vertex in the plurality of light-source vertices, determining a vertex-shadow region of the background surface corresponding to a shadow cast upon the background surface by the occluding polygon for light emitted from the light-source vertex,
      determining an umbra of the shadow of the occluding polygon based on an intersection of the plurality of vertex-shadow regions, and
      determining a penumbra of the shadow of the occluding polygon based on a convex representation of a union of the plurality of vertex-shadow regions; and
   displaying at least part of the shadow of the occluding polygon using the computing device.

2. The method of claim 1, wherein determining the convex representation of the union of the plurality of vertex-shadow regions comprises determining a convex hull of the union of the plurality of vertex-shadow regions.

3. The method of claim 1, wherein determining the convex representation of the union of the plurality of vertex-shadow regions comprises:
   generating a smoothed convex hull by at least applying a filter to the convex hull; and
   determining that the convex representation comprises the smoothed convex hull.

4. The method of claim 1, wherein the shadow of the occluding polygon comprises the umbra and the penumbra, and wherein determining the shadow of the occluding polygon comprises:
   determining a shadow centroid based on a centroid of the umbra and the penumbra; and
   determining a plurality of rays, wherein each ray of the plurality of rays starts at the shadow centroid and goes in a direction of the penumbra.

5. The method of claim 4, wherein determining the shadow of the occluding polygon comprises determining a plurality of polygons representing the penumbra, and wherein the plurality of polygons are based upon the plurality of rays.

6. The method of claim 5, wherein the umbra is associated with an umbra transparency value, wherein an outer edge of the penumbra is associated with a penumbra-outer-edge transparency value, wherein the umbra transparency value differs from the penumbra transparency value, and wherein each of the plurality of polygons representing the penumbra is associated with a polygon transparency value that is based on the umbra transparency value and/or the penumbra-outer-edge transparency value.

7. The method of claim 6, wherein the plurality of polygons representing the penumbra are arranged into one or more polygon layers, and wherein each polygon in a polygon layer of the one or more polygon layers is associated with a predetermined transparency value.

8. The method of claim 1, wherein the occluding polygon is based upon a rectangle.

9. The method of claim 1, wherein providing the display of at least part of the shadow comprises providing a display of the occluding polygon and the at least part of the shadow.

10. The method of claim 9, wherein the occluding polygon is a user-interface element of a graphical user interface (GUI), and wherein providing the display of at least part of the shadow comprises providing a display of the GUI that includes at least part of the occluding polygon and the at least part of the shadow.

11. A computing device, comprising:
    a processor; and
    a non-transitory computer readable medium configured to store at least executable instructions, wherein the executable instructions, when executed by the processor, cause the computing device to perform functions comprising:
       determining a light-source polygon of a polygonal light source configured to emit light, wherein the light-source polygon comprises a plurality of light-source vertices,
       determining an occluding polygon, wherein the occluding polygon is between the light-source polygon and a background surface,
       determining a shadow of the occluding polygon on the background surface by at least:
          for each light-source vertex in the plurality of light-source vertices, determining a vertex-shadow region of the background surface corresponding to a shadow cast upon the background surface by the occluding polygon for light emitted from the light-source vertex,
          determining an umbra of the shadow of the occluding polygon based on an intersection of the plurality of vertex-shadow regions, and
          determining a penumbra of the shadow of the occluding polygon based on a convex representation of a union of the plurality of vertex-shadow regions, and
       displaying of at least part of the shadow of the occluding polygon.

12. The computing device of claim 11, wherein determining the convex representation of the union of the plurality of vertex-shadow regions comprises determining a convex hull of the union of the plurality of vertex-shadow regions.

13. The computing device of claim 12, wherein determining the convex representation of the union of the plurality of vertex-shadow regions comprises generating a smoothed convex hull by at least applying a filter to the convex hull.

14. The computing device of claim 11, wherein the shadow of the occluding polygon comprises the umbra and the penumbra, and wherein determining the shadow of the occluding polygon comprises:
    determining a shadow centroid based on a centroid of the umbra and the penumbra; and
    determining a plurality of rays, wherein each ray of the plurality of rays starts at the shadow centroid and goes in a direction of the penumbra.

15. The computing device of claim 14, wherein determining the shadow of the occluding polygon comprises determining a plurality of polygons representing the penumbra, and wherein the plurality of polygons are based upon the plurality of rays.

16. The computing device of claim 15, wherein the umbra is associated with an umbra transparency value, wherein an outer edge of the penumbra is associated with a penumbra-outer-edge transparency value, wherein the umbra transparency value differs from the penumbra transparency value, and wherein each of the plurality of polygons representing the penumbra is associated with a polygon transparency value that is based on the umbra transparency value and/or the penumbra-outer-edge transparency value.

17. The computing device of claim 16, wherein the plurality of polygons representing the penumbra are arranged into one or more polygon layers, and wherein each polygon in a polygon layer of the one or more polygon layers is associated with a predetermined transparency value.

18. The computing device of claim 11, wherein providing the display of at least part of the shadow comprises providing a display of the occluding polygon and the at least part of the shadow.

19. The computing device of claim 18, wherein the occluding polygon is a user-interface element of a graphical user interface (GUI), and wherein providing the display of at least part of the shadow comprises providing a display of the GUI that includes at least part of the occluding polygon and the at least part of the shadow.

20. An article of manufacture comprising a non-transitory computer readable medium configured to store at least executable instructions, wherein the executable instructions, when executed by a processor of a computing device, cause the computing device to perform functions comprising:
   determining a light-source polygon of a polygonal light source configured to emit light, wherein the light-source polygon comprises a plurality of light-source vertices;
   determining an occluding polygon, wherein the occluding polygon is between the light-source polygon and a background surface;
   determining a shadow of the occluding polygon on the background surface by at least:
      for each light-source vertex in the plurality of light-source vertices, determining a vertex-shadow region of the background surface corresponding to a shadow cast upon the background surface by the occluding polygon for light emitted from the light-source vertex,
      determining an umbra of the shadow of the occluding polygon based on an intersection of the plurality of vertex-shadow regions, and
      determining a penumbra of the shadow of the occluding polygon based on a convex representation of a union of the plurality of vertex-shadow regions; and
   displaying of at least part of the shadow of the occluding polygon.

* * * * *